(12) United States Patent
Keener et al.

(10) Patent No.: US 9,076,468 B1
(45) Date of Patent: Jul. 7, 2015

(54) SCISSOR MAGNETIC READ SENSOR WITH SHAPE ENHANCED SOFT MAGNETIC SIDE SHIELD FOR IMPROVED STABILITY

(71) Applicant: HGST Netherlands B.V., Amsterdam (NL)

(72) Inventors: Christopher D. Keener, San Jose, CA (US); Quang Le, San Jose, CA (US); David J. Seagle, Morgan Hill, CA (US); Neil Smith, San Jose, CA (US); Petrus A. Van Der Heijden, Cupertino, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/207,323

(22) Filed: Mar. 12, 2014

(51) Int. Cl.
*G11B 5/39* (2006.01)

(52) U.S. Cl.
CPC .................................... *G11B 5/3932* (2013.01)

(58) Field of Classification Search
CPC ...... G11B 5/3932; G11B 5/39; G11B 5/3909; G11B 5/3929
USPC ................ 360/313, 319, 324, 324.11, 324.12
See application file for complete search history.

(56) References Cited

U.S. PATENT DOCUMENTS

| | | | |
|---|---|---|---|
| 6,667,862 B2 * | 12/2003 | Zhu .......................... | 360/324.12 |
| 7,177,122 B2 * | 2/2007 | Hou et al. ................ | 360/324.12 |
| 7,446,987 B2 | 11/2008 | Zhang et al. | |
| 7,869,165 B2 | 1/2011 | Miyauchi et al. | |
| 7,876,534 B2 * | 1/2011 | Chou et al. ..................... | 360/319 |
| 8,015,694 B2 | 9/2011 | Carey et al. | |
| 8,018,691 B2 | 9/2011 | Gill et al. | |
| 8,149,546 B2 * | 4/2012 | Ayukawa et al. ............. | 360/324 |
| 8,233,247 B2 | 7/2012 | Carey et al. | |
| 8,289,660 B2 * | 10/2012 | Dimitrov et al. .............. | 360/319 |
| 8,305,715 B2 | 11/2012 | Mauri et al. | |
| 8,369,048 B2 * | 2/2013 | Miyauchi et al. ............. | 360/319 |
| 8,553,369 B2 * | 10/2013 | Song et al. ............... | 360/324.12 |
| 8,630,068 B1 * | 1/2014 | Mauri et al. ................... | 360/319 |
| 8,780,508 B2 * | 7/2014 | Dimitrov et al. .......... | 360/324.12 |
| 8,837,092 B2 * | 9/2014 | Covington et al. ........... | 360/324 |
| 8,854,773 B2 * | 10/2014 | Sapozhnikov et al. ....... | 360/319 |
| 2009/0034132 A1 * | 2/2009 | Miyauchi et al. ............. | 360/324 |
| 2009/0213502 A1 * | 8/2009 | Miyauchi et al. ............. | 360/319 |
| 2011/0007426 A1 | 1/2011 | Qiu et al. | |
| 2011/0026169 A1 | 2/2011 | Gill et al. | |
| 2011/0215800 A1 | 9/2011 | Zhou et al. | |

OTHER PUBLICATIONS

Haginoya et al., "Side-Shielded Tunneling Magnetoresistive Read Head for High-Density Recording," IEEE Transactions on Magnetics, vol. 40, No. 4, Jul. 2004, pp. 2221-2223.
Zheng et al., "Side Shielded TMR Reader With Track-Width-Reduction Scheme," IEEE Transactions on Magnetics, vol. 42, No. 10, Oct. 2006, pp. 2303-2305.

* cited by examiner

*Primary Examiner* — Angel Castro
(74) *Attorney, Agent, or Firm* — Zilka-Kotab, PC

(57) ABSTRACT

A scissor type magnetic sensor having a soft magnetic side shields for improved sensor stability. The soft magnetic side shield structure extends from the side of the sensor and although being constructed of a low coercivity soft magnetic material it has a shape the causes the magnetization of the side shield layer to remain oriented in a desired direction parallel to the media facing surface. The side shields include first and second magnetic layers with an antiparallel coupling layer sandwiched between them. Each of the magnetic layers of the side shield structure has a width measured perpendicular to the media facing surface and a thickness measured perpendicular to the width and parallel with the media facing surface, both the width and the thickness being less than 10 times an intrinsic exchange length of the magnetic layer.

22 Claims, 34 Drawing Sheets

SCISSOR MAGNETIC READ SENSOR WITH SHAPE ENHANCED SOFT MAGNETIC SIDE SHIELD FOR IMPROVED STABILITY

FIELD OF THE INVENTION

The present invention relates to magnetic data recording and more particularly to a scissor type magnetic sensor having a back edge soft magnetic biasing structure and an anti-parallel coupled soft magnetic side shield structure for improved free layer stabilization.

BACKGROUND

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has a media facing surface (MFS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When a current flows through the coil, a resulting magnetic field causes a magnetic flux to flow through the write pole, which results in a magnetic write field emitting from the tip of the write pole. This magnetic field is sufficiently strong that it locally magnetizes a portion of the adjacent magnetic disk, thereby recording a bit of data. The write field, then, travels through a magnetically soft underlayer of the magnetic medium to return to the return pole of the write head.

A magnetoresistive sensor such as a Giant Magnetoresistive (GMR) sensor or a Tunnel Junction Magnetoresisive (TMR) sensor can be employed to read a magnetic signal from the magnetic media. The magnetoresistive sensor has an electrical resistance that changes in response to an external magnetic field. This change in electrical resistance can be detected by processing circuitry in order to read magnetic data from the adjacent magnetic media.

As the need for data density increases there is an ever present need to decrease the size of a magnetic read sensor. With regard to linear data density along a data track, this means reducing the gap thickness of a magnetic sensor. Currently used sensors, such as the GMR and TMR sensors discussed above, typically require 4 magnetic layers, 3 ferromagnetic (FM) and 1 antiferromagnetic (AFM) layer, along with additional nonmagnetic layers. Only one of the magnetic layers serves as the active (or free) sensing layer. The remaining "pinning" layers, while necessary, nonetheless consume a large amount of gap thickness. One way to overcome this is to construct a sensor as a "scissor" sensor that uses only two magnetic "free" layers without additional pinning layers, thus potentially reducing gap thickness to a significant degree. However, the use of such a magnetic sensor results in design and manufacturing challenges, such as the need to maintain proper magnetic relative orientations of the magnetic free layers.

SUMMARY

A magnetic sensor is provided that includes a sensor stack having first and second free magnetic layers and a non-magnetic layer sandwiched between the first and second free magnetic layers and having a front edge facing a media facing surface, a back edge opposite the front edge and first and second laterally opposed sides. The sensor also includes a soft magnetic side shield structure including first and second soft magnetic layers and an anti-parallel coupling layer sandwiched between the first and second soft magnetic layers. The magnetic layers of the side shield structure have a shape that causes their magnetizations to remain oriented in a desired direction even though the soft magnetic layers are constructed of a soft magnetic material.

The sensor can also include a soft magnetic bias structure, located adjacent to the back edge of the sensor stack. The bias structure can have a shape that allows its magnetization to remain oriented perpendicular to the MFS even though constructed of a soft magnetic material. In addition, the soft magnetic bias structure can be exchange coupled with a layer of antiferromagnetic material in order to keep its magnetization pinned in the desired direction.

The side shield structure can be configured such that each of the magnetic layers has a length parallel with the media facing surface, a width perpendicular to the media facing surface and a thickness parallel with the media facing surface and perpendicular to both the width and length. Both the width and thickness are preferably less than about 10 times the intrinsic exchange length $l_{ex}$ of the soft magnetic bias material. This configuration advantageously allows the magnetic layers of the side shield structure to have magnetizations that remain oriented parallel with the media facing surface as desired, even in spite of the soft magnetic properties of the magnetic layers.

These and other features and advantages of the invention will be apparent upon reading of the following detailed description of preferred embodiments taken in conjunction with the figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
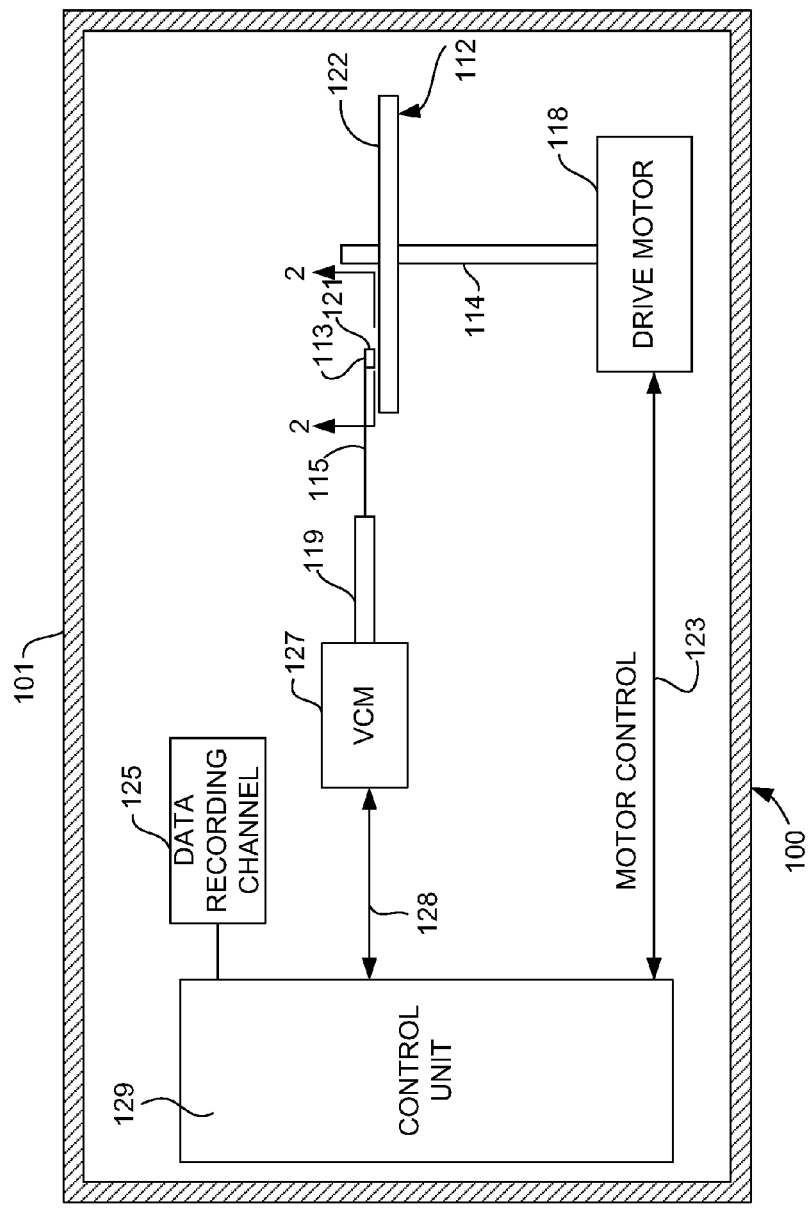
FIG. 1 is a schematic illustration of a disk drive system in which the invention might be embodied.

Referring now to FIG. 1, there is shown a disk drive 100 embodying this invention. The disk drive 100 includes a housing 101. At least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
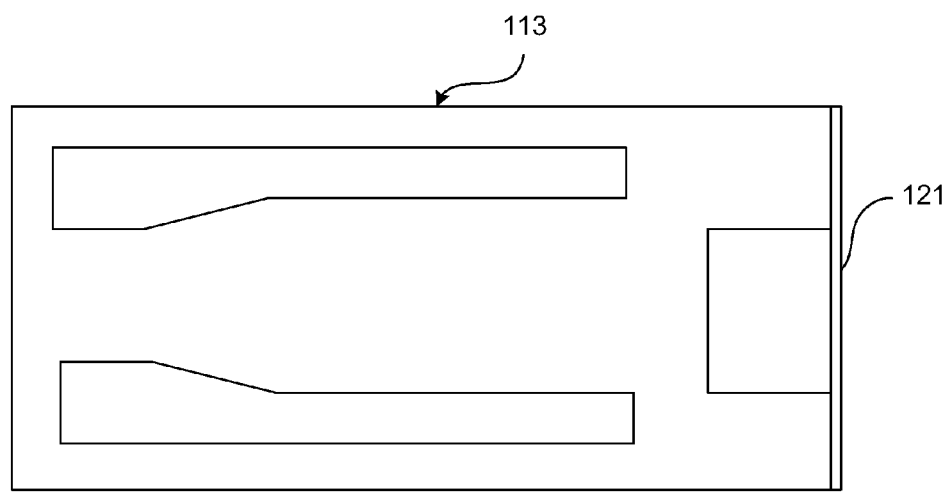
FIG. 2 is an MFS view of a slider illustrating the location of a magnetic head thereon.

With reference to FIG. 2, the orientation of the magnetic head 121 in a slider 113 can be seen in more detail. FIG. 2 is a media facing surface view of the slider 113, and as can be seen the magnetic head including an inductive write head and a read sensor, is located at a trailing edge of the slider. The above description of a typical magnetic disk storage system and the accompanying illustration of FIG. 1 are for representation purposes only. It should be apparent that disk storage systems may contain a large number of disks and actuators, and each actuator may support a number of sliders.

Figure 3A:
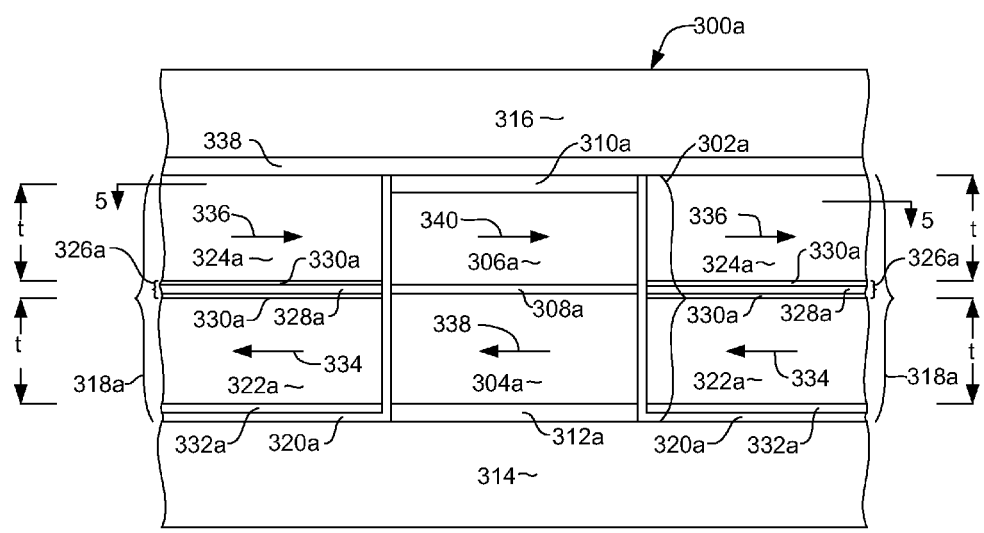
FIG. 3a is a media facing surface view of a scissor type magnetic read sensor.

FIG. 3a shows a view of a magnetic read head 300a according to a possible embodiment of the invention as viewed from the media facing surface. The read head 300a is a scissor type magnetoresistive sensor having a sensor stack 302a that includes first and second free layers 304a, 306a that are anti-parallel coupled across a non-magnetic layer 308a that can be a non-magnetic, electrically insulating barrier layer such as MgOx or an electrically conducting spacer layer such as AgSn. A capping layer structure 310a can be provided at the top of the sensor stack 302a to protect the layers of the sensor stack during manufacture and to magnetically decouple the sensor stack 302a from the upper shield 316. The sensor stack 302a can also include a seed layer structure 312a at its bottom to promote a desired grain growth in the above formed layers.

The first and second magnetic layers 304a, 306a can be constructed of multiple layers of magnetic material. For example, the first magnetic layer 304a can be constructed of: a layer of Ni—Fe; a layer of Co—Hf deposited over the layer of Ni—Fe; a layer of Co—Fe—B deposited over the layer of Co—Hf; and a layer of Co—Fe deposited over the layer of Co—Fe—B. The second magnetic layer 306a can be constructed of: a layer of Co—Fe; a layer of Co—Fe—B deposited over the layer of Co—Fe; a layer of Co—Hf deposited over the layer of Co—Fe—B; and a layer of Ni—Fe deposited over the layer of Co—Hf. The capping layer structure 310a can also be constructed as a multi-layer structure and can include first and second layers of Ru with a layer of Ta sandwiched there-between. The seed layer structure 312a can include a layer of Ta and a layer of Ru formed over the layer of Ta.

The sensor stack 302a is sandwiched between leading and trailing magnetic shields 314, 316, each of which can be constructed of a magnetic material such as Ni—Fe, of a composition having a high magnetic permeability (t) to provide effective magnetic shielding.

During operation, a sense current or voltage is applied across the sensor stack 302a in a direction perpendicular to the plane of the layers of the sensor stack 302a. The shields 314, 316 can be constructed of an electrically conductive material so that they can function as electrical leads for supplying this sense current or voltage across the sensor stack 302a. The electrical resistance across the sensor stack 302a depends upon direction of magnetization of the free magnetic layers 304a, 306a relative to one another. The closer the magnetizations of the layer 304a, 306a are to being parallel to one another the lower the resistance will be, and, conversely, the closer the magnetizations of the layers 304a, 306a are to being anti-parallel to one another the higher the resistance will be. Since the orientations of the magnetizations 338, 340 of the layers 304a, 306a are free to move in response to an external magnetic field, this change in magnetization direction and resulting change in electrical resistance can be used to detect a magnetic field such as from an adjacent magnetic media (not shown in FIG. 3a). The relative orientations of the magnetizations 338, 340 of the layers 304a, 306a will be described in greater detail below with reference to FIG. 5. If the non-magnetic layer 308a is an electrically insulating barrier layer, then the sensor operates based on the spin dependent tunneling effect of electrons tunneling through the barrier layer 308a. If the layer 308a is an electrically conductive spacer layer, then the change in resistance results from spin dependent scattering phenomenon.

With continued reference to FIG. 3a, the sensor 300a also includes anti-parallel soft magnetic side shield structures 318a at either side of the sensor stack 302a. Each of the side shield structures 318a is separated from the sensor stack 302a and bottom shield 314 by a thin, non-magnetic, electrical insulation layer 320a, which can be a material such as alumina, SixNy, $Ta_2O_5$, or MgO. Each of the side shields structures 318a includes first and second soft magnetic layers 322a, 324a that are anti-parallel coupled with one another across an anti-parallel coupling layer 326a. The soft magnetic layers 322a, 324a are constructed of a material such as NiFe, NiFeCr, CoNiFe, or an alloy thereof that has a low magnetic coercivity and high magnetization saturation. The soft magnetic layers 322a, 324a can be constructed of the same material or can be constructed of different materials having differing magnetic moments (Bs). Each of the anti-parallel coupling layers 326a can include a non-magnetic layer such as Ru 328a, sandwiched between layers of Co or CoFe 330a (such as for example CoFe/Ru/CoFe) to increase coupling strength. A seed layer 332a can be provided at the bottom of the shield structure 318a to provide a desired grain structure in the layers 322a, 324a, 326a formed there-above. The soft magnetic layers 322a, 324a have magnetizations 334, 336 respectively that are oriented in opposite directions, each parallel with the media facing surface.

Figure 3B:
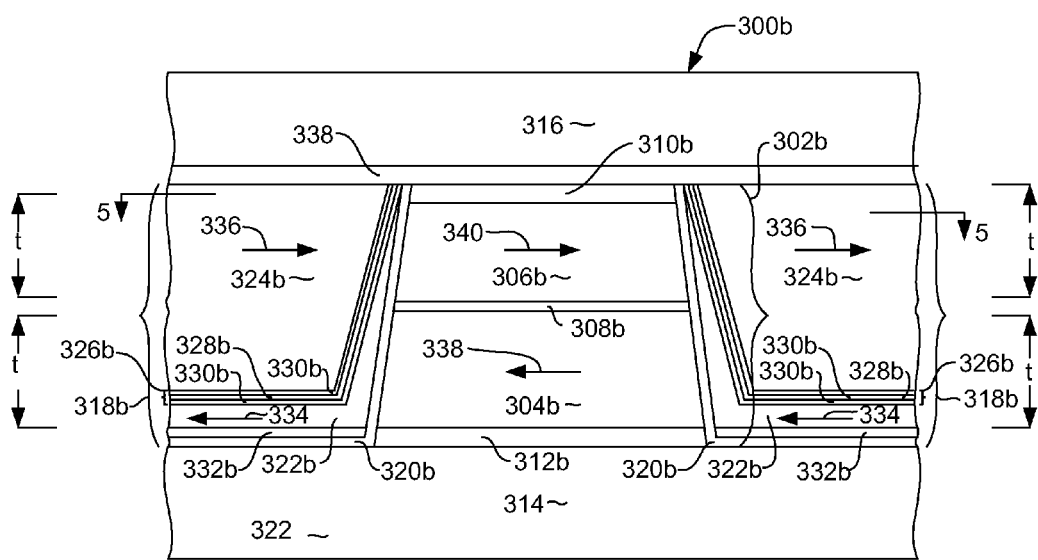
FIG. 3b is a media facing surface view of a scissor type magnetic read sensor according to an alternate embodiment of the invention.

As shown in FIG. 3b, in another embodiment, the Ru layer 328b can be configured such that it is not aligned with layer 308b. In this case, the thicknesses of layers 324b and 322b can be adjusted for optimal stability and performance. The mechanism for maintaining these magnetizations 334, 336 and their effects on the magnetizations 338, 340 of the free layers 304b, 306b will be described in greater detail herein below. In FIGS. 3a and 3b the bias structures 318a, 318b are magnetically decoupled from the upper shield 316 by a non-magnetic de-coupling layer 338. The magnetizations of the soft magnetic layers 322a, 324a (FIG. 3a) or 322b, 324b (FIG. 3b) of the shield structures 318a, 318b can be maintained solely by a shape enhancement mechanism that will be described in greater detail herein below. Also, in FIG. 3b, the sensor stack 302b along with its various layers 312b, 304b, 308b, 306b, 310b can be formed with tapered sides as shown.

Figure 4A:
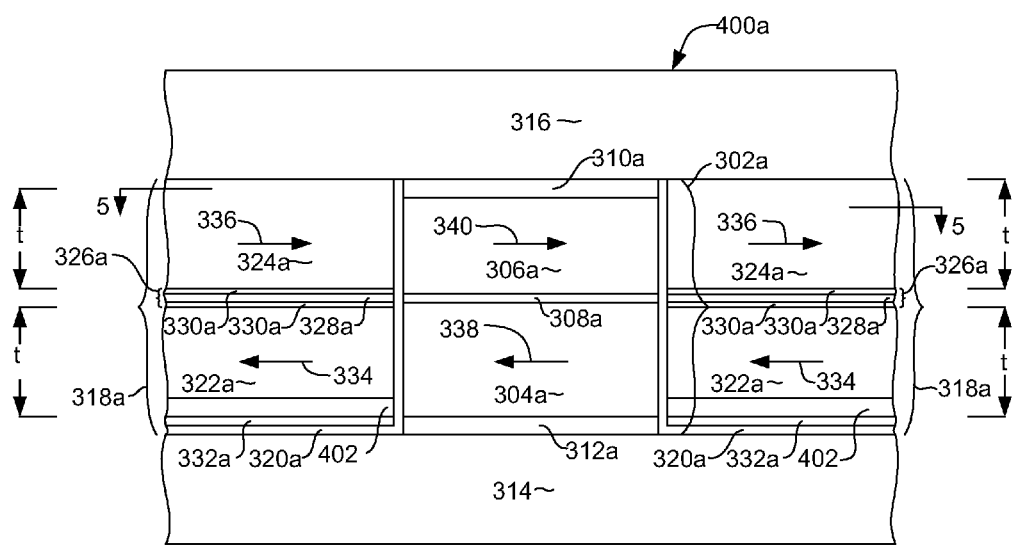
FIG. 4a is a media facing surface view of a scissor type magnetic read sensor according to an alternate embodiment of the invention.

However, with reference to FIG. 4a, in another embodiment of the invention 400a a layer of antiferomagnetic material (AFM layer) 402 can be exchange coupled with one or both of the soft magnetic layers 322a, 324a in order to pin the magnetizations 322, 324 of the side shield structure 318a.

Figure 4B:
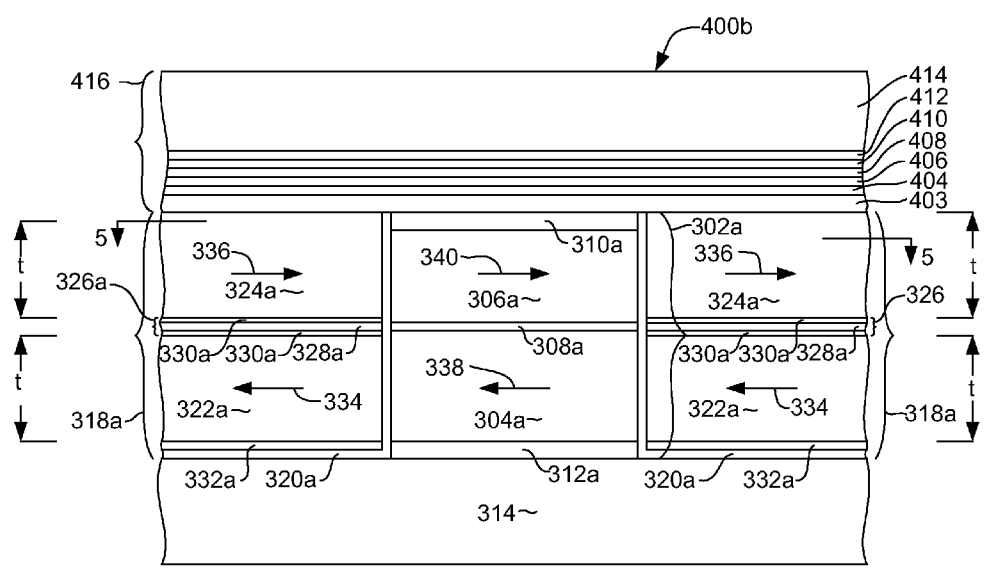
FIG. 4b is a media facing surface view of a scissor type magnetic read sensor according to another embodiment of the invention.

In another embodiment, as shown in FIG. 4b, the side shield structure 318a can be stabilized by an AFM layer formed at the top of the side shield structure 318a. In this embodiment 400b, the upper shield structure 416 can provide the exchange pinning for maintaining the magnetizations 336, 334 of the layers 324a, 322a. The upper shield structure 416 can include: a first layer of NiFe 403 formed over the sensor stack 302a and side shield 318a; a first layer of CoFe 404 formed over the first layer of NiFe 403; an exchange layer such as Ru 406 formed over the first layer of CoFe 404; a second layer of CoFe 408 formed over the exchange layer 406; a second layer of NiFe 410 formed over the second layer of CoFe 408; a layer of anti-ferromagnetic material such as IrMn 412 formed over the second layer of NiFe 410; and a third layer of NiFe 414 formed over the layer of antiferromagnetic material 412. The third layer of NiFe 414 can make up the majority of the upper shield 416, whereas the layers 403-412 allow the layer of anti-ferromagnetic layer 412 to set the magnetization 336 of the magnetic layer 324a of the side shield structure 318b.

Figure 4C:
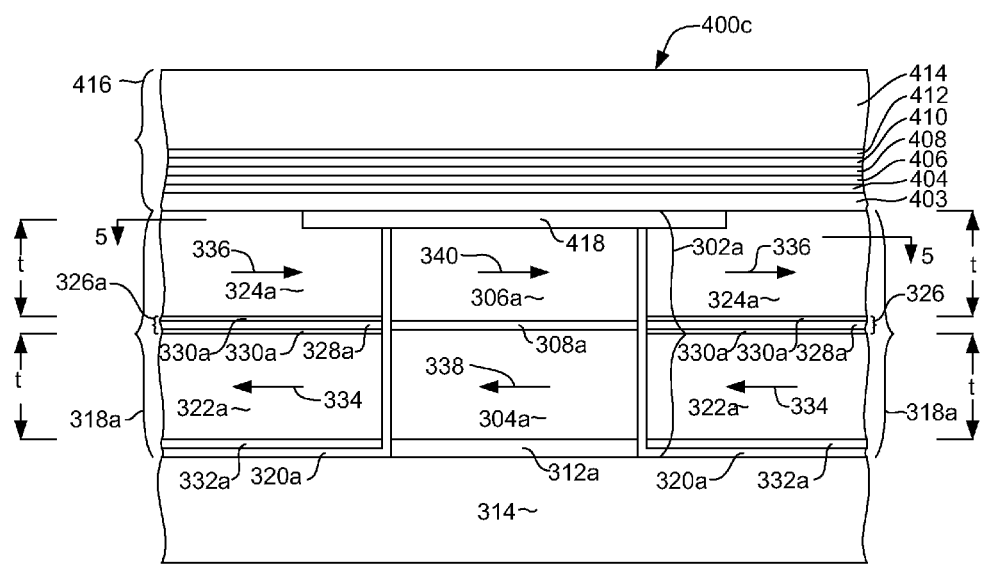
FIG. 4c is a media facing surface view of a scissor type magnetic read sensor according to another embodiment of the invention.

FIG. 4c shows still another embodiment 400c wherein the magnetizations 334, 336 are fixed by a combination of both exchange coupling with the upper shield (as in the above FIG. 4b) and also by the above mentioned shape enhancement which will be described herein below. In FIG. 4c, the bias layer 324a is exchange coupled with the upper shield as described above with reference to FIG. 4c. However, a region directly near the sensor stack 302a is decoupled from the upper shield 416 to prevent the coupling from affecting the free layers 306a, 304a. One possible way to provide this decoupling is to form a capping layer 418 that extends slightly beyond the sides of the sensor stack 302a, as shown. The region of decoupling can extend 100 nm to 300 nm from the sides of the sensor stack 302a. In the embodiment described with reference to FIG. 4c, (as well as that of FIGS. 3a and 3b above) the sensor layers have a shape as described below with reference to FIG. 5 that provides the novel shape enhancement for maintaining the magnetic orientation of the magnetic layers of the bias structure 318a.

Figure 5:
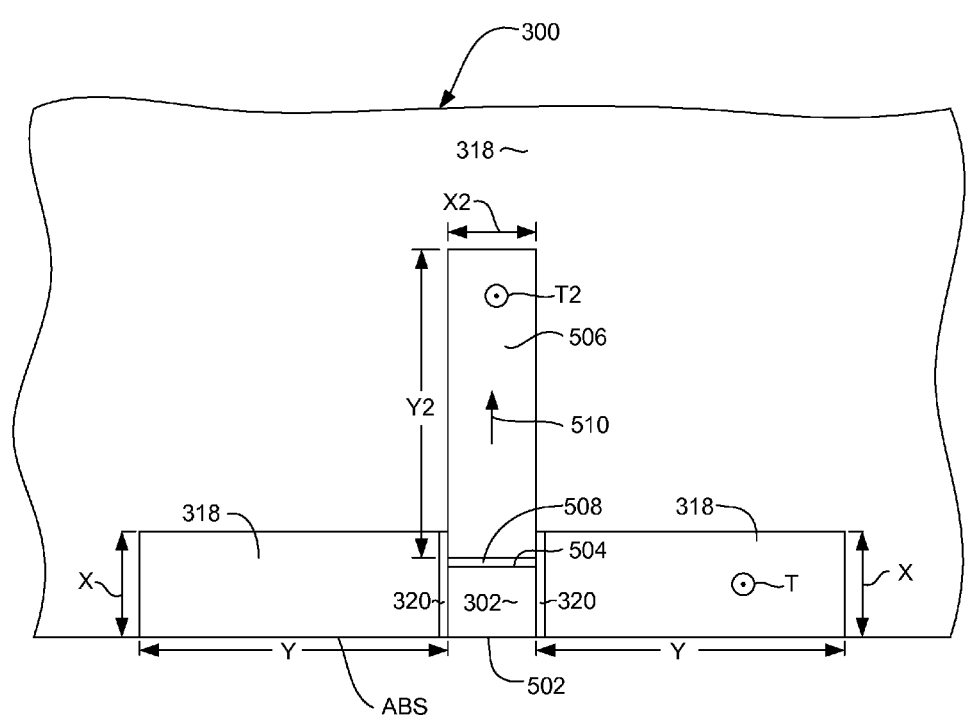
FIG. 5 is a top down, cross sectional view showing bias and shield structures of the scissor type sensor of FIG. 3 or 4.

FIG. 5 shows a top down, cross sectional view as seen from line 5-5 of FIGS. 3a, 3b, 4a, 4b, and 4c. FIG. 5 shows the sensor stack having a front edge 502 that extends to the media facing surface (MFS) and has a back edge 504 opposite the front edge 502. The distance between the front edge 502 and back edge 504 defines the stripe height of the sensor stack 302. As can be seen in FIG. 5, the sensor 300 also includes a soft magnetic bias structure 506 that extends from the back edge 504 of the sensor stack 302 in a direction away from the media facing surface. The soft magnetic bias structure 506 can be constructed of a soft magnetic material having a relatively low coercivity. The term "soft" as used herein refers to a magnetic material that has a low magnetic coercivity that does not inherently maintain a magnetic state as a result of its grain structure as a hard, or high coercivity, magnetic material would do. This distinction will be further discussed herein below. The soft magnetic bias structure 506 is separated from the sensor stack 302 by a non-magnetic, electrically insulating layer 508 such as alumina, $Si_3N_4$, MgO, $Ta_2O_5$, or a combination thereof. A non-magnetic fill layer 512 can fill the layer outside of the bias structure 506 and side shields 318a.

As discussed above, the soft magnetic bias structure 506 is constructed of a soft magnetic material (i.e. a material having a low magnetic coercivity). To this end, the soft magnetic bias structure 506 can be constructed of a material such as NiFe, NiFeCr, CoFe, CoNiFe, or alloys thereof. More preferably, for optimal magnetic biasing the magnetic bias structure 506 is constructed of a high magnetization saturation (high Bs) material, for example, NiFe having 50 to 60 atomic percent or about 55 atomic percent Fe or CoFe. The soft magnetic bias structure has a magnetization 510 oriented in a direction perpendicular to the media facing surface as shown. The effect of this magnetization and a mechanism for maintaining this magnetization 510 will be described in greater detail herein below.

Figure 6:
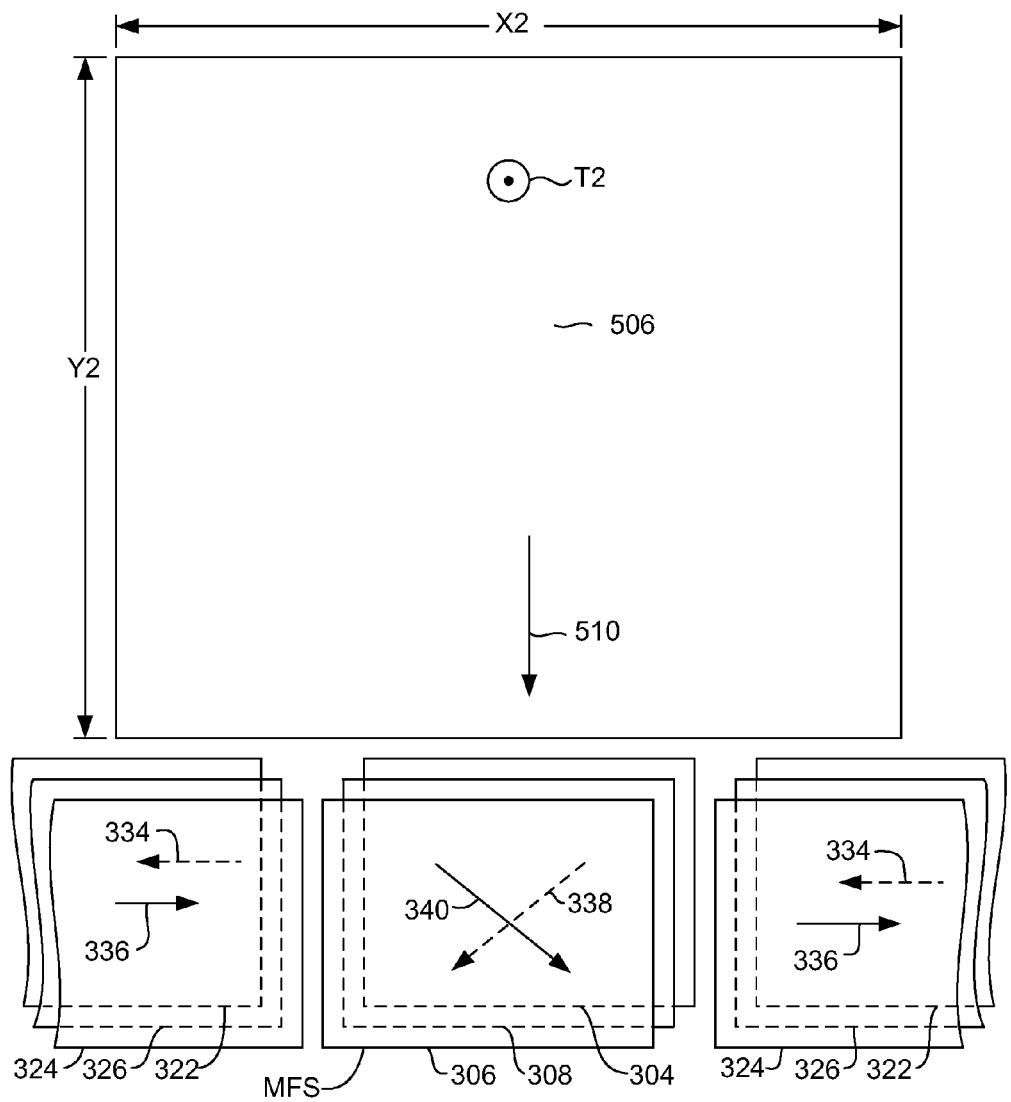
FIG. 6 is an exploded schematic view illustrating the effect of biasing and side shielding on free layer magnetization.

FIG. 6 shows an exploded schematic view of the sensor 300. As shown in FIG. 6, the free layers 304, 306 have magnetizations 338, 340 that are oriented generally orthogonal to one another. In the absence of a magnetic field from the magnetization 510 bias layer 506, the magnetizations 338, 340 would tend to align anti-parallel to one another in a direction parallel with the media facing surface, as a result of the anti-parallel coupling of the free layers 304, 306 and a magnetic anisotropy in a direction parallel with the media facing surface.

However, the presence of the magnetic field from the magnetization 510 of the bias structure 506 causes the magnetizations 338, 340 rotate so that they are generally orthogonal as shown. However, the magnetizations 338, 340 can respond to a magnetic field by rotating in a scissoring fashion. While the bias layer rotates the magnetizations 338, 340 of the free layers 304, 306 in desired orthogonal directions, the magnetization 510 of the bias layer 406 does not prevent the magnetizations 338, 340 from flipping direction (e.g. magnetization 336 pointing to the right and 338 pointing to the left), which would render the sensor 300 unstable.

The magnetizations 334, 336 from the layers 322, 324 of the soft side shield structure 318 (FIG. 3) prevent this. As can be seen in FIG. 3, the magnetic layer 322 is aligned with the bottom free layer 304 and the upper magnetic layer 324 is aligned with the upper free layer 306. Therefore, the magnetization 334 tends to pull the magnetization 338 in one direction parallel with the media facing surface, whereas the magnetization 336 tends to pull the magnetization 340 in an opposite direction parallel to the media facing surface. This effectively prevents the magnetizations 338, 340 from flipping direction and greatly improves the reliability of the sensor. Although not shown, in another embodiment, the magnetic layers 322, 324 can be configured so that they are not aligned with one another but the thickness of each can be adjusted for optimal performance and stability.

Figure 7:
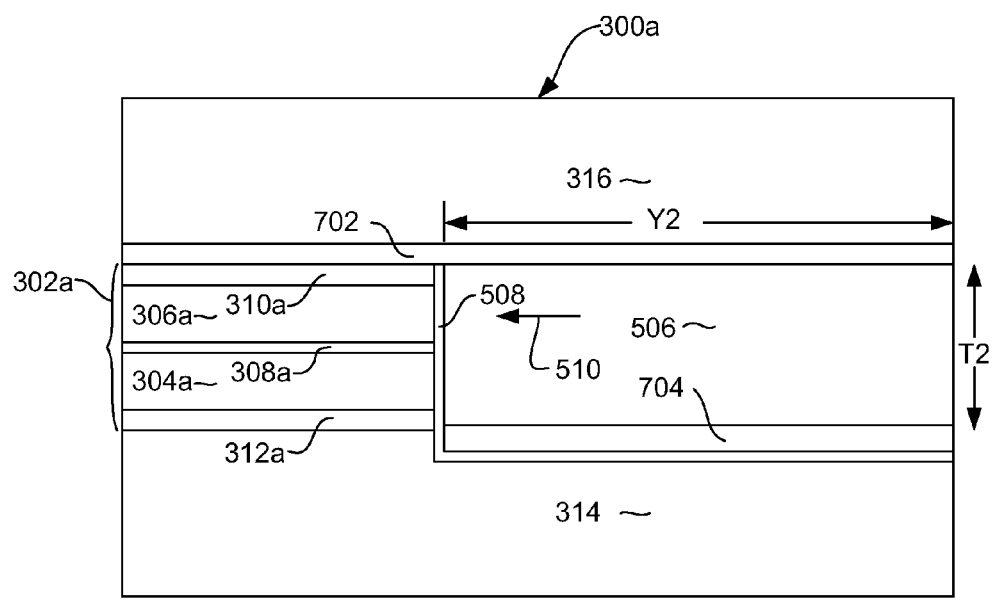
FIG. 7 is a side cross sectional view of the scissor type magnetic sensor.

FIG. 7 shows a side cross sectional view of the sensor 300a. In FIG. 7, it can be seen that the soft magnetic bias structure 506 can be separated from the upper shield 316 by a non-magnetic de-coupling layer 702 such Ru, Ta, Ti, or Rh (preferably Ru). This decoupling layer 702 magnetically de-couples the bias layer 506 from the upper shield 316. Pinning of the magnetization 510 of the soft magnetic bias structure 506 can be improved by providing a layer of anti-ferromagnetic material (AFM layer) 704, which can be formed beneath the soft magnetic bias layer structure 506 and exchange coupled therewith.

With reference again to FIG. 5, it can be seen that the soft magnetic side shield structures 318a each have a length Y measured in the direction parallel to the media facing surface (MFS) that is significantly larger than its width X as measured in a direction perpendicular to the media facing surface. The soft magnetic side shield structures 318a also have a thickness T that is measured perpendicular to both the length Y and the width X and parallel with the media facing surface.

The soft magnetic side shield structures 318a are formed with a shape that causes the magnetization 510 to remain oriented in the desired direction parallel to the media facing surface, even in spite of the soft magnetic properties of the material of which it is constructed. The magnetic layers 322a, 324a, 322b, 324b (FIGS. 3 and 4) of the soft magnetic side shield structures 318a are constructed of a material having an intrinsic exchange length $l_{ex}$, and the dimensions of the magnetic layers 322a, 324a of the soft magnetic side shield structure 318a are preferably such that both the width X and thickness T are less than 10 times the exchange length $l_{ex}$. The term exchange length as used herein can be defined as $l_{ex}$=sqrt [A/(2pi*Ms*Ms)], where "Ms" is the saturation magnetization of the material, "A" is the exchange stiffness. In one embodiment, the magnetic layers 322a, 324a of the soft magnetic side shield structure 318a can be constructed of one or more of Co, Ni and Fe having an intrinsic exchange length $l_{ex}$ of 4-5 nm, and has a width X that is less than 40 nm, and a thickness T that is less than 20 nm.

The soft magnetic layers 322a, 324a of the bias structure 318a take advantage of this shape enhancement to allow their magnetizations 334a, 336a to remain oriented in the desired direction parallel with the media facing surface. It can also be seen with reference to FIG. 5, that the soft magnetic side shields 318a extend about 10-20 nm beyond the sensor stack 302a, so that they have a stripe height that is close to that of the sensor stack 302a. This can achieved by a process that will be described below, and also allows the bias side shields 318a to meet the above described dimension constraints with regard to Y, X and T (FIG. 5).

Figure 8:
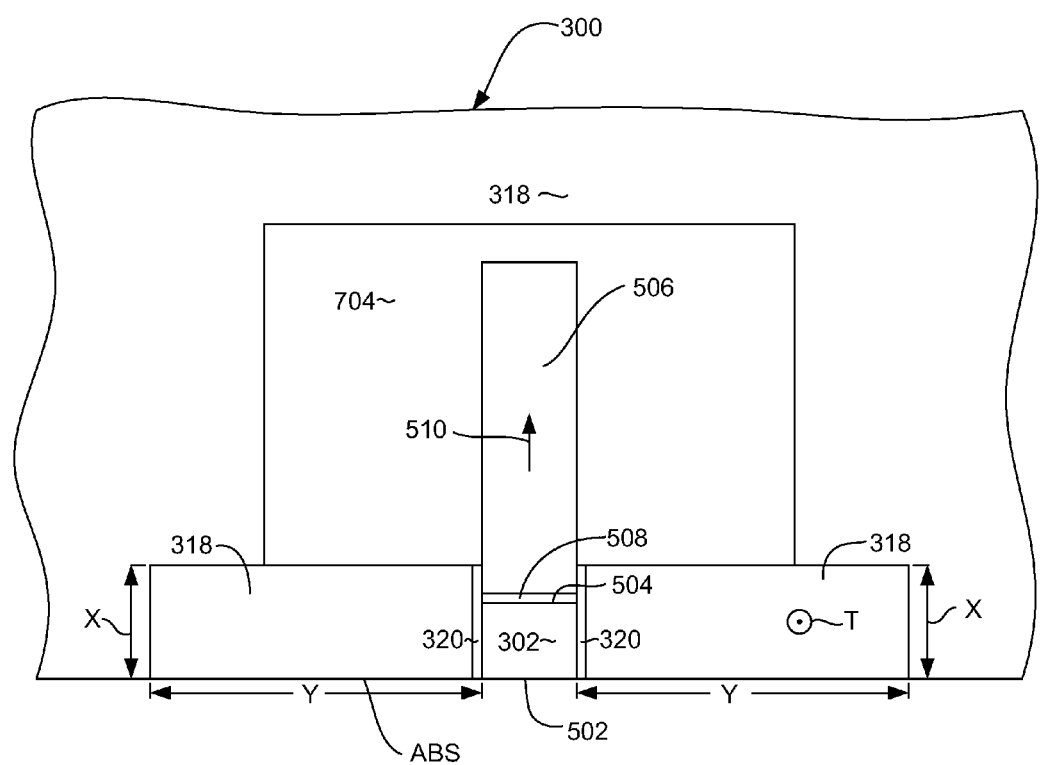
FIG. 8 is a top down view similar to that of FIG. 5 illustrating an alternate embodiment of the invention.

FIG. 5 shows an embodiment where the AFM layer 704 (FIG. 7) is self aligned with, and has the same width as, the bias structure 506. With reference to FIG. 8, however, another possible embodiment is shown wherein the AFM layer 704 extends beyond the bias layer structure 506 and has a greater width than the bias layer structure 506. In this case, the bias structure 506 can be self aligned with the sensor stack 302a as shown or can be wider than the sensor stack 302a.

Like the soft magnetic side shields 318a, the soft magnetic bias structure 506 can be configured so that it takes advantage of the above describe shape parameters in order to maintain its magnetization 510 oriented in a direction perpendicular to the media facing surface (MFS). To this end, the bias structure 506 can be configured with a width X2 measured parallel with the media facing surface, a length Y2 measured perpendicular to the media facing surface and a thickness T2 measured perpendicular to both the length and width. Again, in this case the width X2 and thickness T2 of the bias layer would be less than 10 times the intrinsic exchange length $l_{ex}$.

Figure 9:
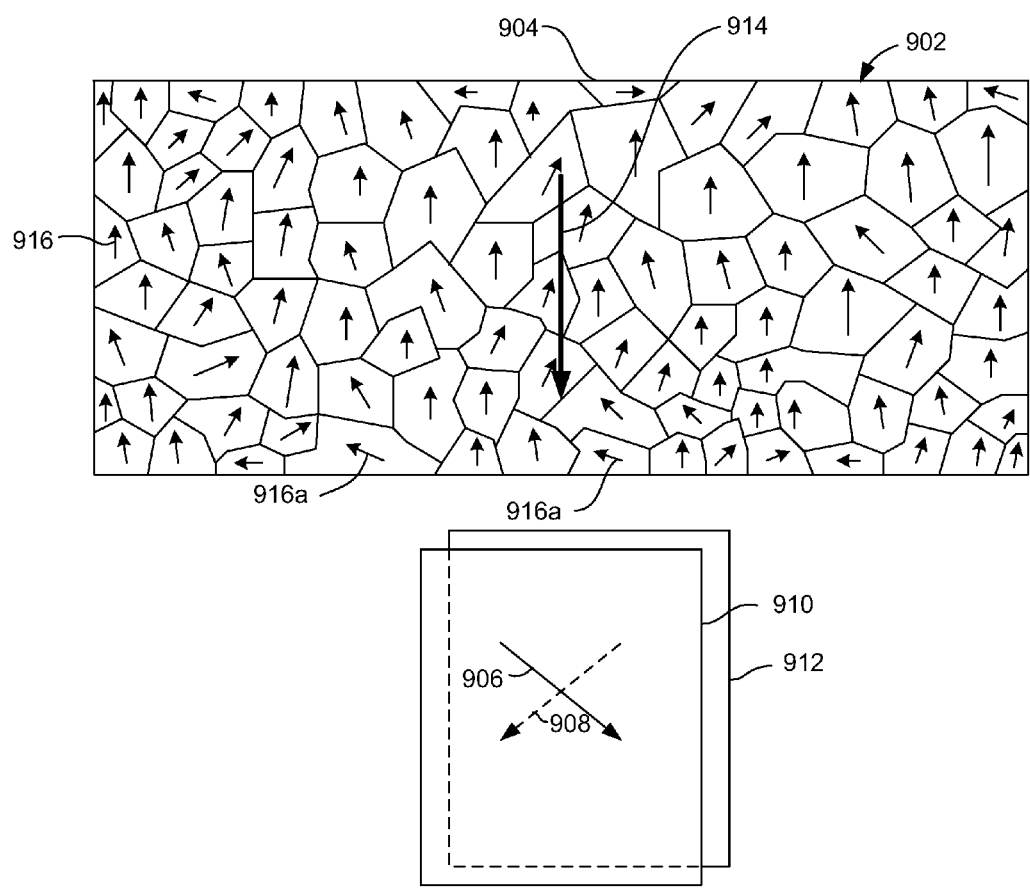
FIG. 9 is a schematic illustration of a prior art back edge hard magnetic biasing structure.
Figure 10:
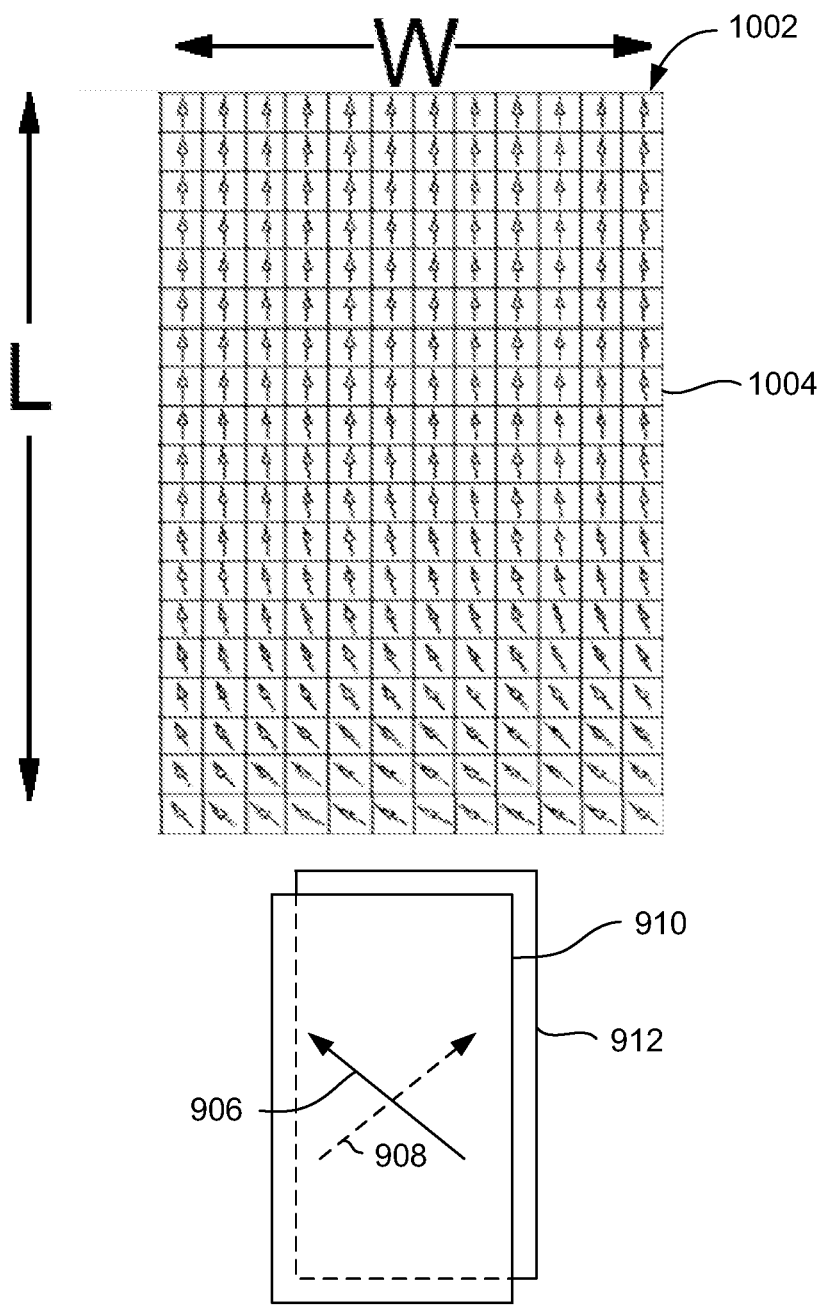
FIG. 10 is a schematic illustration of a soft magnetic biasing structure that does not employ a desired shape enhancement for the soft magnetic layer.
Figure 11:
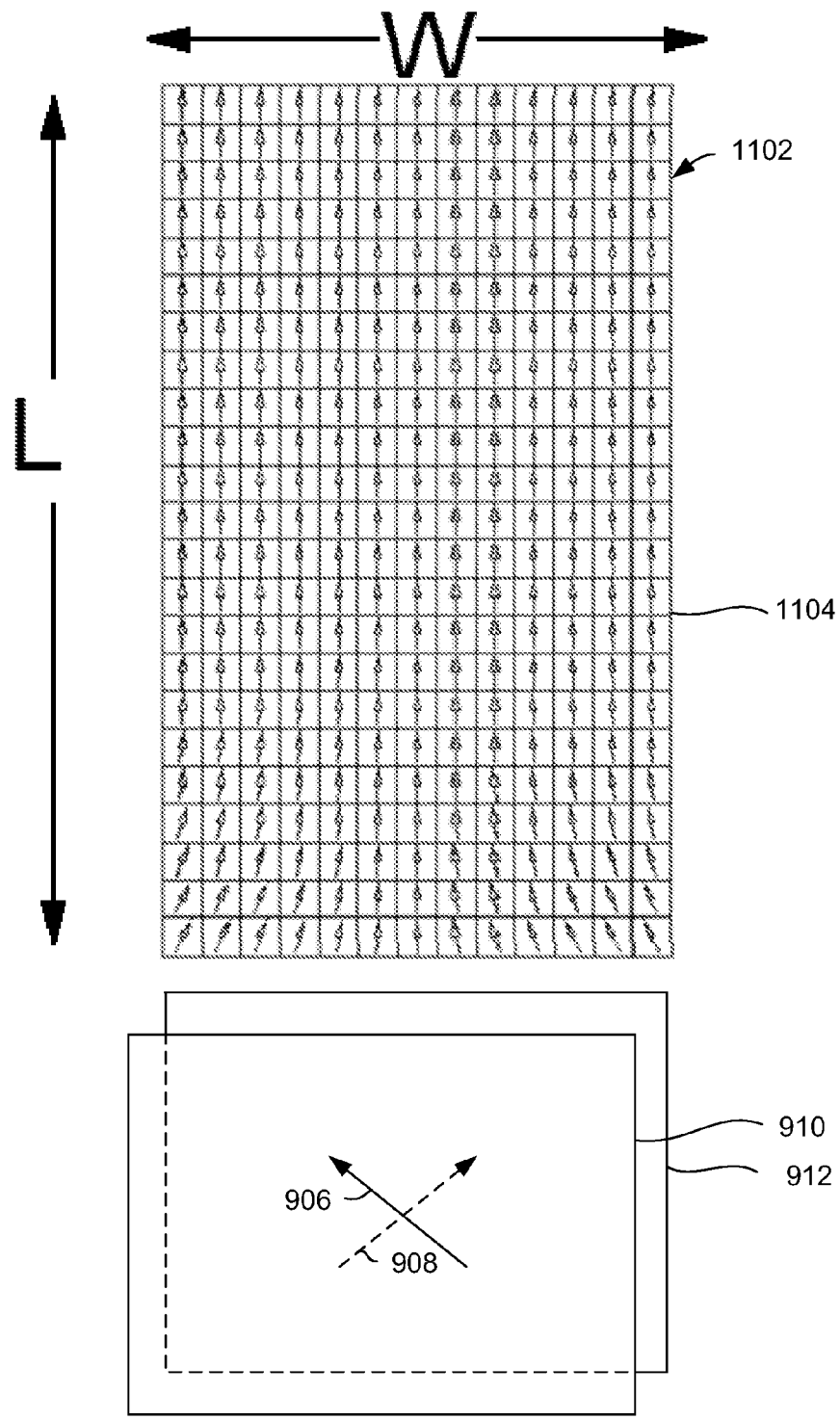
FIG. 11 is a schematic illustration of a magnetic biasing or shielding structure having a desired shape enhancement of the magnetic layer.

The advantages provided by a magnetic read sensor having a soft magnetic side shield structure 318a as described above (or bias layer 506) can be better understood with reference to FIGS. 9, 10 and 11. FIG. 9 schematically illustrates a sensor 902 having a prior art hard magnetic side shield structure 904. This view of the free layers 910, 912 and side shield magnetic layer 904 is rotated 90 degrees relative to the views of FIG. 5 and 6. Only one magnetic side bias layer 904 is shown in FIG. 9 for purposes of clarity, although it should be understood that the bias structure 904 could include two anti-parallel magnetic layers. The magnetization vectors 906, 908 of the two magnetic free-layers 910, 912 are at approximately orthogonal angles, and this arrangement is maintained by a vertical magnetic field 914 from the "hard-magnetic side bias" layer 904, which is a high coercivity, "permanent" (or magnetically "hard") magnetic material such as CoPt.

Because the side shield structure 904 maintains its magnetization by virtue of its hard magnetic properties, it can be made much wider than the width of the sensor. This allows for increased bias field, and also reduces the criticality of lateral alignment with the sensor layers 910, 912. This hard-magnetic side shield layer 904 maintains its magnetization orientation, and thus constant magnetic bias field 914, by its intrinsic nature as a hard magnetic material whose magnetization will not be altered either by internal demagnetization, or as the resultant magnetic fields arising from the recording media or those from the scissor sensor itself. The mean direction of the magnetization (here in the vertical direction) of the hard magnetic material can be set by a one-time application of an external magnetic field exceeding the coercivity of the hard magnetic material (typically a few kOe). However, for most practically available hard magnetic materials (e.g., CoPt), the magnetization orientations of the individual magnetic grains (5-10 nm diameter) predominantly follow the crystal anisotropy axes of the individual grains, (which are somewhat random/isotropic), and inter-granular exchange forces between grains are insufficiently strong relative crystal anisotropy to align the individual grain magnetizations in one direction. Even if on average the grain magnetization orientation is well aligned in the vertical direction as indicated by individual arrows 916 (not all of which are labeled in FIG. 9 for purposes of clarity) individual grains can be oriented in some other direction that is not perpendicular to the media facing surface. Since it is those few grains closest to the back edge of the scissor sensor which play the largest role in determining the bias field to the scissor sensor, there exists the likelihood of substantial device-to device variation of the side bias field, and hence variation in the bias magnetization configuration of the free-layers. For example, although the magnetizations 916 of the grains are on average oriented parallel to the media facing surface as shown, some of the grains at the edge can be oriented in a direction that is not parallel to the media facing surface as indicated by arrows 916a.

Another challenge presented by the use of a hard magnetic side shield structure 904 arises out of practical considerations related to the formation of such a side shield structure 904 in an actual sensor. As discussed above, hard magnetic properties needed to maintain magnetization arise from the proper material film growth of the magnetic side shield structure 904. In order for this to occur, the hard magnetic side shield structure 904 must generally be grown up from a proper seed layer that is flat and uniform. However, as a practical matter, there will inevitably be some topography variation at the side edge of the sensor. This can result in poor growth and poor magnetic properties (e.g., low coercivity) in the side shield structure 904 at the side edge of the sensor, which is the very location at which good magnetic properties are most important. This, therefore, further increases the likelihood of device to device variation in free layer biasing.

FIG. 10, on the other hand, illustrates a magnetic sensor 1002 having a soft magnetic side shield structure 1004 that does not take advantage of the unique shape configurations discussed above with reference to FIG. 5. In the sensor of FIG. 10, the side shield structure 1004 is notably longer in the stripe height direction than the sensor, somewhat similar in this particular respect to the side shield structure 904 of FIG. 9. As discussed above, making the side shield structure relatively long in the stripe height direction can increase the magnetic field provided by the side shield structure. Because the material is a soft magnetic material, the inter-granular exchange interaction between grains of "soft" magnetic materials is strong relative to a weaker, residual crystal anisotropy, and the magnetization orientations of the individual grains prefers to locally align everywhere parallel to each other, essentially averaging out the discrete nature of the grains and materially resembling an ideal homogeneous material not subject to the detrimental randomness of grain variations in hard magnetic materials. However, even though the local magnetizations of neighboring grains tend to align highly parallel to one another, the direction of the magnetization in the soft side shield layer 1004 is not solely and simply set by the one-time application of an external magnetic field, as described above with reference to a hard magnetic side shield layer. In particular, once such a setting field is removed, self-demagnetizing fields tend to try and align the magnetization in the soft side shield layer at or near surfaces and/or edges to preferentially lie in a direction tangential to the surface or edge. Therefore, as shown in FIG. 10, the "wide" soft bias layer's magnetization at its edge closest to the sensor layers 910, 912, will substantially deviate from the desired direction parallel to the media facing surface, causing a large reduction in the magnetic field it provides on the sensor layers 910, 912 (less than that achievable using prior art hard side shield) and no longer maintaining a proper magnetization state for adequate functionality of the scissor sensor.

FIG. 11 on the other hand, shows a sensor 1102 that has a soft magnetic side shield structure 1104 that has physical dimensions as described above with reference to FIG. 5 that allow the magnetization of the soft magnetic side shield layer to be well set in the desired direction parallel to the media facing surface, even at the edge closest to the sensor layers 910, 912 and even in the presence of self demagnetizing fields from the soft magnetic side shield layer (or from the sensor layers 910, 912 or from the media).

To achieve the soft magnetic side shield magnetization condition illustrated in FIG. 11, there are two geometric/material constraints that should be met. Firstly, the length L of the soft-bias layer should greatly exceed its width, i.e. L>>W. However, this condition may already exist as in the case of FIG. 11, and is thus insufficient to maintain the desired magnetic orientation. It is additionally desirable that the physical width W (and or soft-bias layer film thickness t) be further restricted in size relative to the intrinsic exchange length $l_{ex}$ of the constituent magnetic material used for the soft bias layer, so that local intra-layer exchange stiffness favoring uniform (vertical) alignment of the magnetization exceeds the magnetostatic interactions that would otherwise cause the magnetization to "curl" away from the vertical direction and cause it to lie more tangential to the edges, as illustrated in FIG. 10. As discussed above, an approximately stated condition for exchange stiffness to dominate over magnetostatics is that the soft-bias layer's geometry additionally satisfy the constraint that $W<10*l_{ex}$ and $t<10*l_{ex}$. For common material choices consisting of alloys of Co, Ni, and Fe, the exchange length $l_{ex}$ is approximately 4-5 nm. Hence, soft-bias layers with geometries of practical interest, e.g., with W<40 nm and t<20 nm, satisfy these criteria.

In addition, the saturation magnetization $M_s$ of the Co, Ni, Fe alloys that would be available choices for the soft magnetic side shield layer can be substantially larger than the saturation remanence $M_{rs}$ of typical hard-bias material (e.g, CoPt). In fact, the saturation magnetization $M_s$ of such alloys can be twice the saturation remanence $M_{rs}$ of typical hard magnetic side shield materials (e.g, CoPt). Because of this, the bias field from the soft magnetic side shield layer can be as large or larger than that available from a hard magnetic side shield layer despite the approximate constraint that the soft magnetic side shield width satisfy W<40 nm, providing adequate and sufficient magnetic field strength to maintain the proper bias configuration of a scissor sensor.

Figure 12:
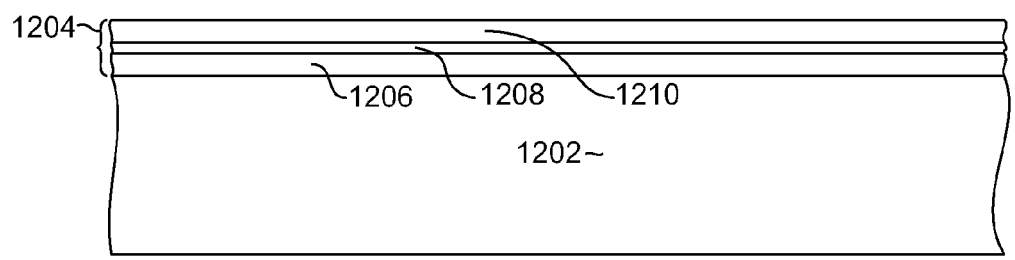
FIGS. 12-29 show a magnetic sensor in various intermediate stages of manufacture in order to illustrate a method of manufacturing a magnetic sensor according to an embodiment of the invention.

With reference now to FIGS. 12-30 methods are described for manufacturing a magnetic sensor according to possible embodiments. With particular reference to FIG. 12, a bottom magnetic, electrically conductive shield 1202 is formed. Then, a series of sensor layers 1204 is deposited over the shield 1202. The sensor layers can include a bottom sensor portion 1206 that includes a first magnetic free layer structure, a non-magnetic spacer or barrier layer 1208 formed over the bottom sensor portion 1206, and an upper sensor portion 1210 that includes a second magnetic free layer structure and sensor cap formed over the non-magnetic barrier or spacer layer 1208.

Figure 13:
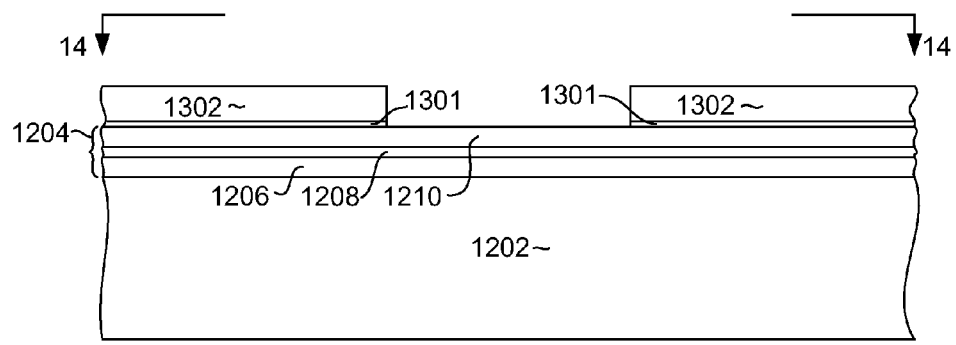
Figure 14:
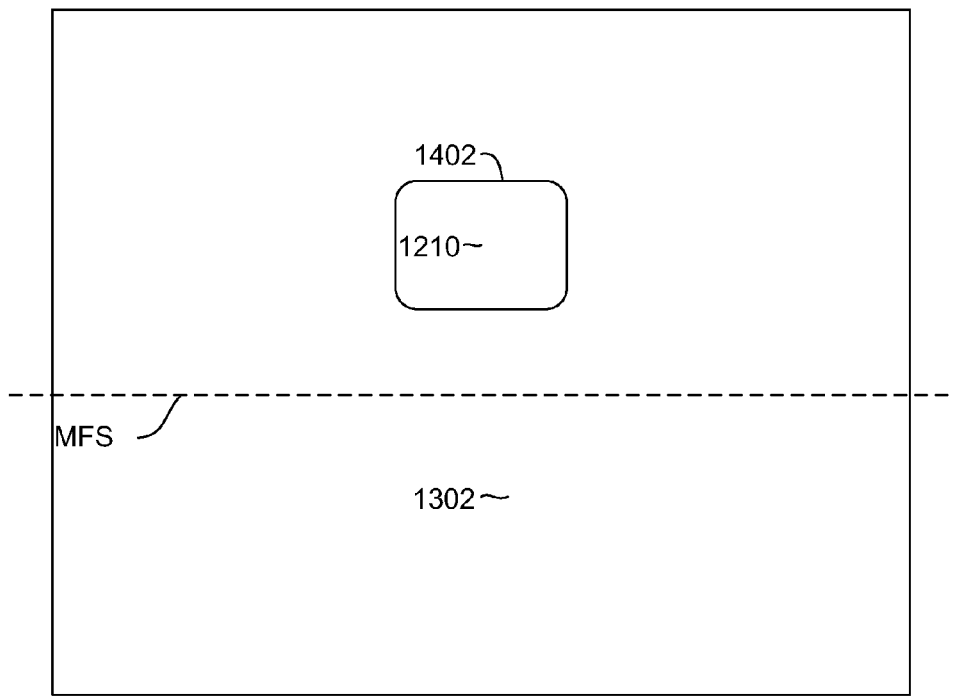

With reference to FIGS. 13 and 14, mask 1302 is formed over the sensor layers 1204. FIG. 14 is a top down view as seen from line 14-14 of FIG. 13. As can be seen in FIG. 14, the mask 1302 includes an opening 1402 that is located a desired distance from an intended media facing surface plane, the location of which is indicated by the dashed line denoted as MFS in FIG. 14. The location of the opening 1402 will determine the location of a soft magnetic bias structure as well as the stripe height of the sensor, as will be seen below. A layer of material that is resistant to chemical mechanical polishing (CMP stop layer) 1301 is deposited beneath the mask 1302 and patterned by reactive ion etching (RIE). This CMP stop layer 1301 can be a material such as carbon or diamond like carbon (DLC).

Figure 15:
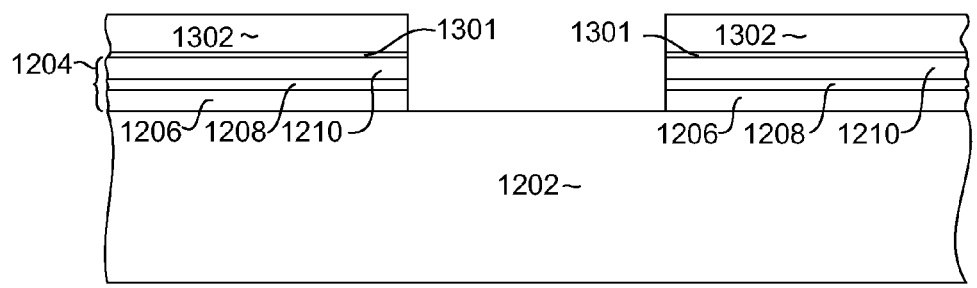
Figure 16:
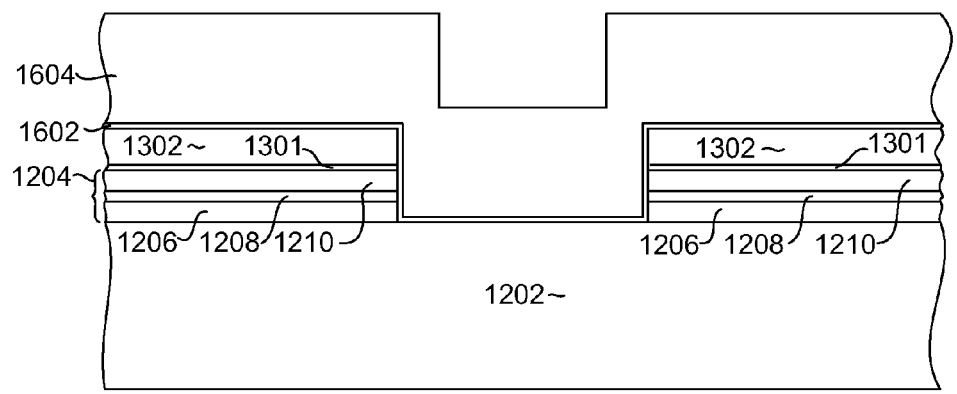

With reference now to FIG. 15, an ion milling is performed to remove portions of the sensor layers 1204 that are not protected by the mask 1302 (e.g. portions of the sensor layers 1204 that are exposed through the opening 1402 in the mask 1302 as shown in FIG. 14). Then, with reference to FIG. 16, a thin layer of non-magnetic, electrically insulating material such as alumina, $Si_3N_4$, $Ta_2O_5$, MgO, or a combination thereof 1602 is deposited followed by a thicker layer of soft magnetic material 1604.

Figure 17A:
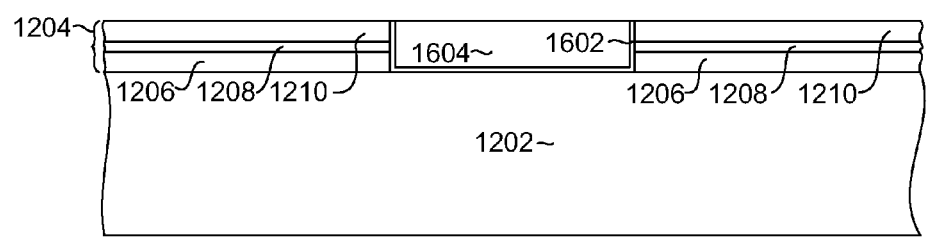
Figure 17B:
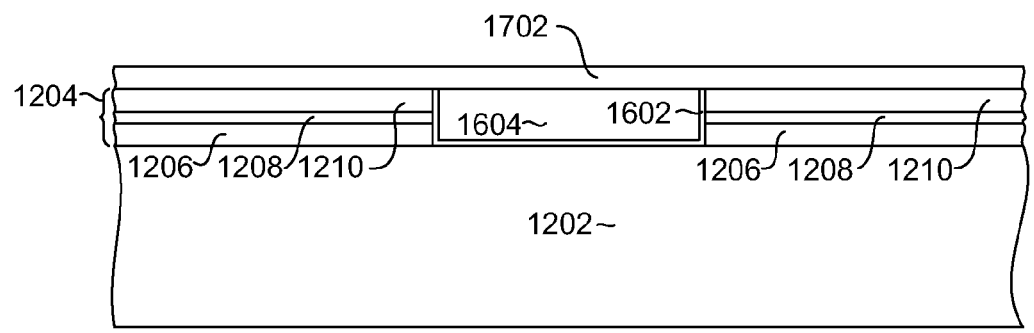

The soft magnetic material 1604 is a material having a low magnetic coercivity and a high saturation magnetization, such as 2.4 Telsa. Mask liftoff and planarization processes are then performed to remove the mask 1302 and form a smooth planar surface. These processes can include depositing a second DLC stop layer (not shown) over the soft magnetic bias material 1604 and then performing a chemical mechanical polishing, followed by a quick reactive ion etching to remove any remaining CMP stop layers, leaving a structure as shown in FIG. 17a. As shown in FIG. 17b, a nonmagnetic conducting layer such as Ru 1702 can be deposited to magnetically decouple the softbias material 1604 from the upper shield (not yet formed).

Figure 18:
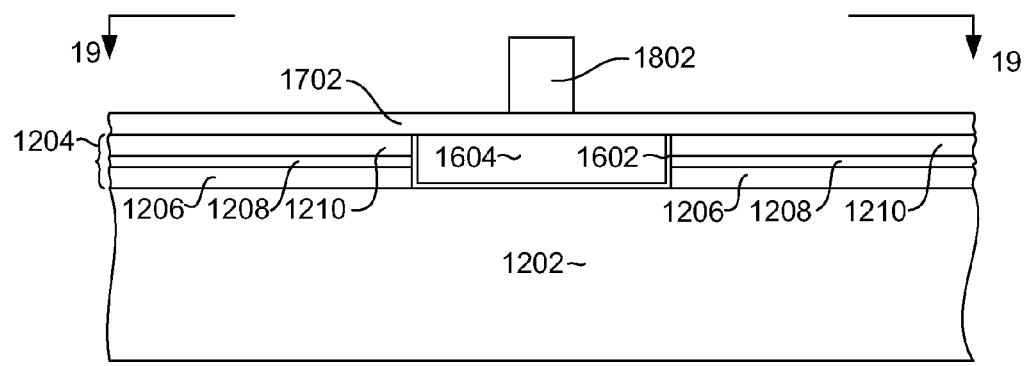
Figure 19:
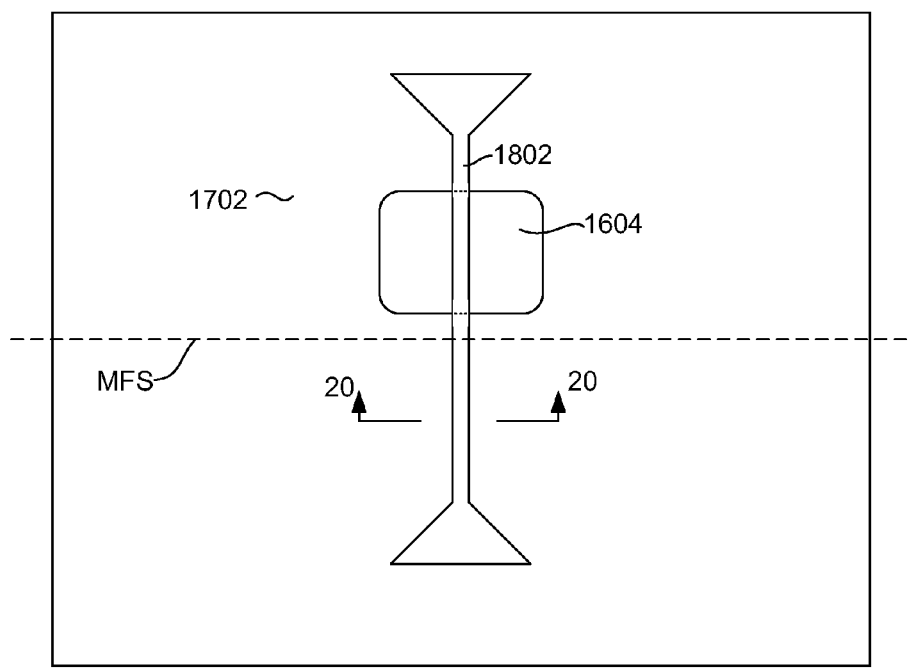
Figure 20:
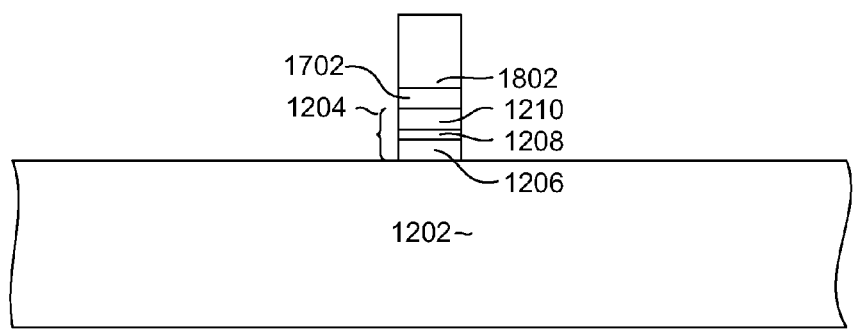
Figure 21:
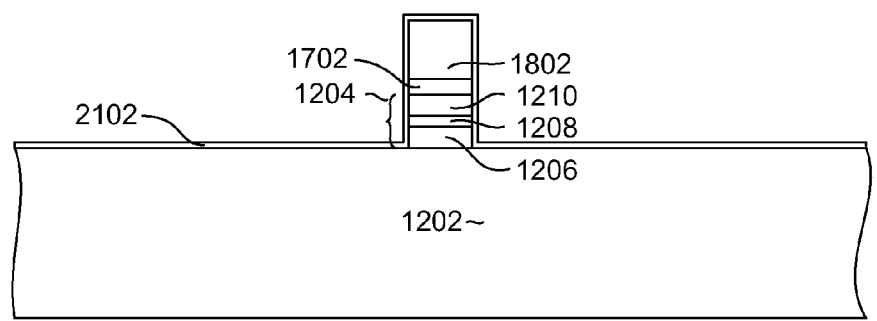

With reference to FIGS. 18 and 19, a track-width defining mask 1802 is formed over the sensor layers 1204 and soft bias 1604. FIG. 19 is a top down view as seen from line 19-19 of FIG. 18. A second ion milling can then be performed to remove portions of the sensor layers 1204 and soft bias 1604 that are not protected by track-width defining mask 1802. A cross section along line 20-20 of FIG. 19 is shown in FIG. 20. As shown in FIG. 21, a thin layer of electrically insulating, non-magnetic material 2102, such as alumina $Si_3N_4$, $Ta_2O_5$, MgO, or a combination thereof is then deposited, preferably by a conformal deposition process such as atomic layer deposition or ion beam deposition.

Figure 22:
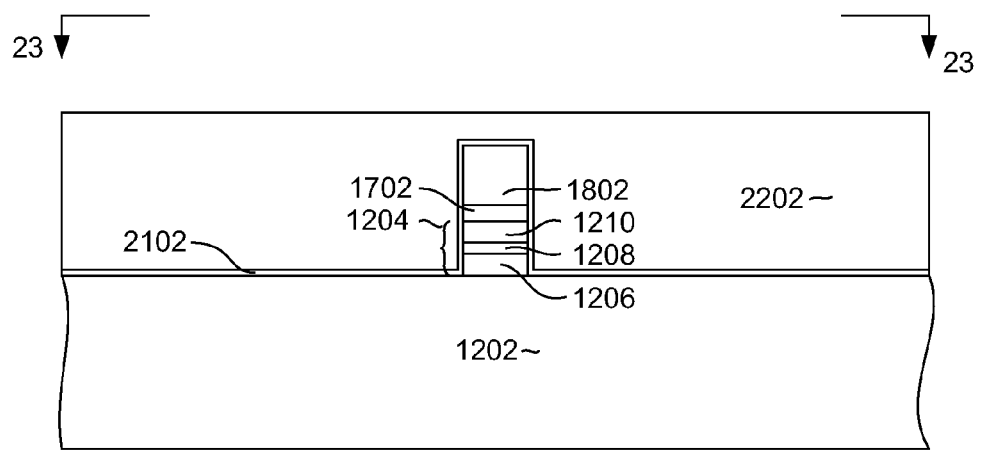
Figure 23:
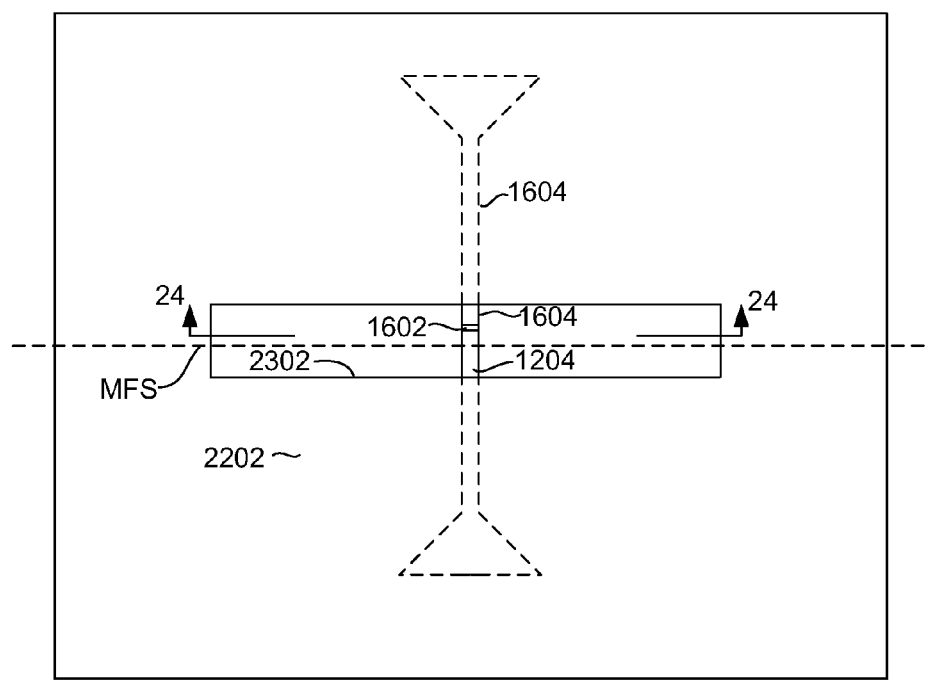
Figure 24A:
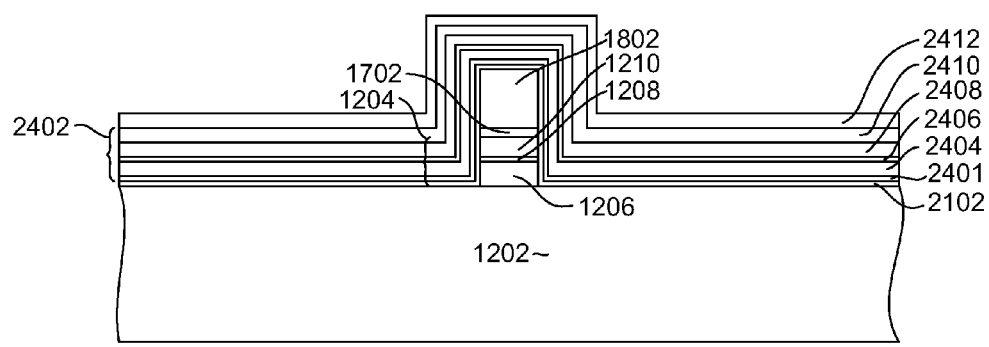

With reference now to FIGS. 22 and 23, a side shield defining mask 2202 is formed. The side shield defining mask 2202 is an electrodepositing frame mask. FIG. 23 is a top down view as seen from line 23-23 of FIG. 22. As seen in FIG. 23, the mask 2202 has an opening 2302 that is configured to define the shape of a side shield. With the mask 2202 in place, as shown in FIG. 24a a magnetic shield structure 2402 is deposited. In one possible embodiment, an anti-ferromagnetic material 2401 can be deposited. However in another embodiment this layer 2401 can be eliminated. This layer 2401 can be a material such as IrMn or PtMn. While this layer 2401 is shown as being at the bottom of the bias structure 2402, it could be deposited at some other point in the deposition process. A first layer of magnetic material 2404 is deposited. This layer 2404 is a magnetic material having a low magnetic coercivity and high saturation magnetization (e.g. 1.0 Tesla), such as NiFe 20/80 or NiFe, NiFeCr, CoFe, CoFe, CoNiFe or their alloys thereof, and can be deposited by ion beam deposition (IBD). This is followed by a non-magnetic anti-parallel coupling layer 2406 (which may include a layer of non-magnetic material such as Ru sandwiched between first and second magnetic layers such as Co, CoFe or alloys thereof). This is followed by a second magnetic layer having a low magnetic coercivity 2408 such as NiFe 20/80 or more generally NiFe 20/80, NiFe, NiFeCr, CoFe, CoFe, CoNiFe or alloys thereof. If an AFM layer 2401 is deposited at the bottom as shown, a non-magnetic, electrically insulating capping layer 2410 is deposited after layer 2408. If there is no bottom AFM layer 2401, then the capping layer 2410 can be eliminated. A layer of material that is resistant to chemical mechanical polishing (CMP stop layer) 2412 is then deposited over the soft magnetic bias structure 2402. This leaves a structure as shown in FIG. 24a, which is a cross sectional view as seen from line 24-24 of FIG. 23. The layer 2406 may or may not be aligned with the layer 1208, depending upon design considerations.

Figure 24B:
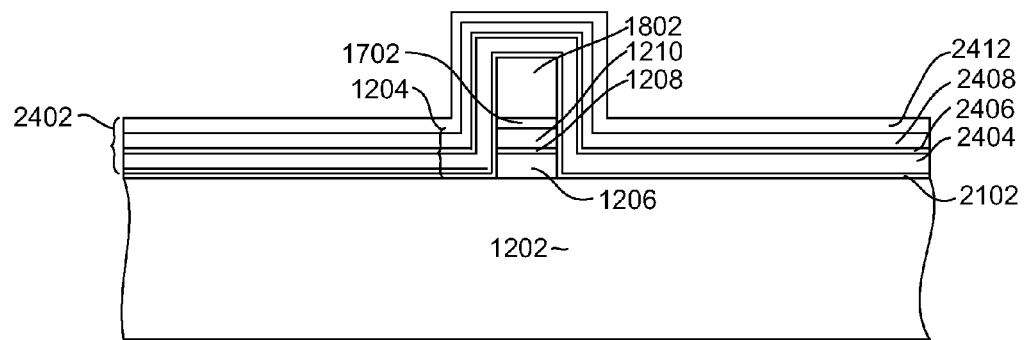

In another embodiment as shown in FIG. 24b, an AFM layer structure is formed at the top rather than at the bottom, a first layer of magnetic material 2404 is deposited over the thin electrically insulating layer 2102. This layer 2404 is a magnetic material having a low magnetic coercivity and high saturation magnetization (e.g. 1.0 Tesla), such as NiFe 20/80 or more generally NiFe, NiFeCr, CoFe, CoFe, CoNiFe or their alloys thereof, and can be deposited by ion beam deposition (IBD). This is followed by a non-magnetic anti-parallel coupling layer 2406 (which may include a layer of non-magnetic material such as Ru sandwiched between first and second magnetic layers such as Co, CoFe or alloys thereof). This is followed by a second magnetic layer having a low magnetic coercivity 2408 such as NiFe 20/80, NiFe, NiFeCr, CoFe, CoFe, CoNiFe or their alloys thereof. An optional layer of material that is resistant to chemical mechanical polishing (CMP stop layer) 2412 can be deposited over the soft magnetic bias structure 2402. This leaves a structure as shown in FIG. 24b, which is a cross sectional view as seen from line 24-24 of FIG. 23. The layer 2406 may or may not be aligned with the layer 1208, depending upon design considerations.

Figure 25:
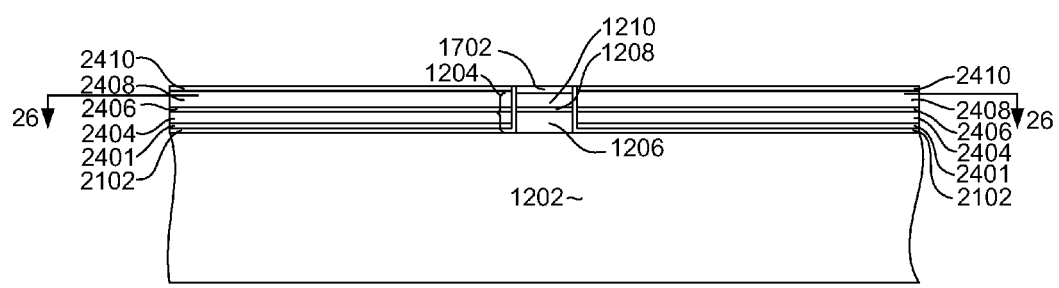
Figure 26:
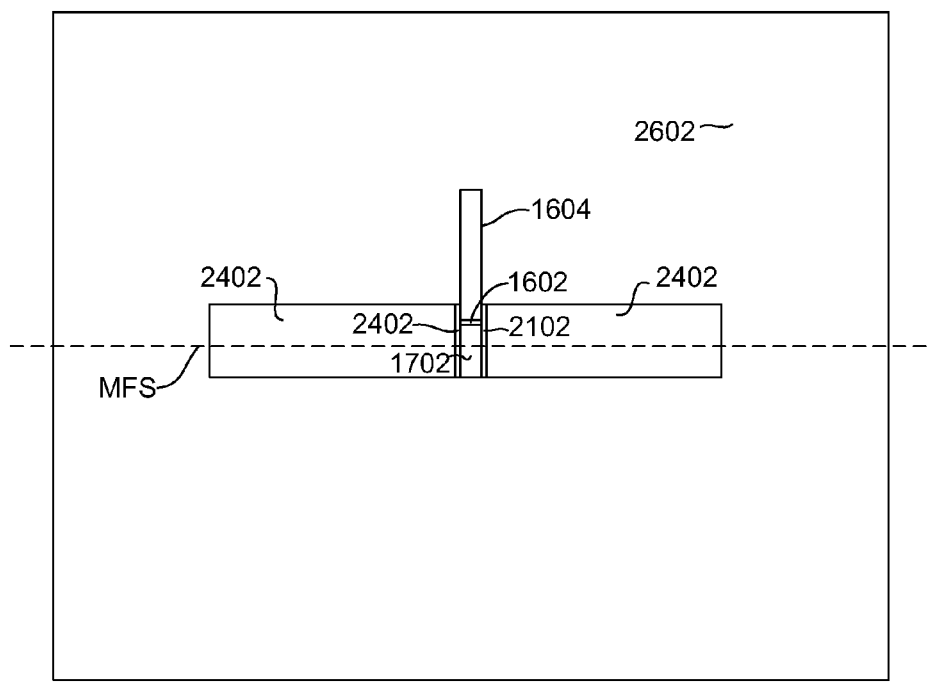

The shield mask 2202 is then removed and a non-magnetic, electrically insulating fill layer such as alumina 2602 (shown in FIG. 26, but not shown in FIG. 25) is deposited. Although not shown, an optional second CMP stop layer can be used. A combination of chemical mechanical polishing (CMP) and reactive ion etching (RIE) are then performed to remove the mask 1802, planarize the refill layer 2602 and remove the CMP stop layer 2412 (FIG. 24), leaving a structure as shown in FIGS. 25 and 26. FIG. 26 shows the shield 2402 and surrounding alumina refill 2602, as well as the remaining sensor 1204 and soft bias structure 1604.

Figure 27:
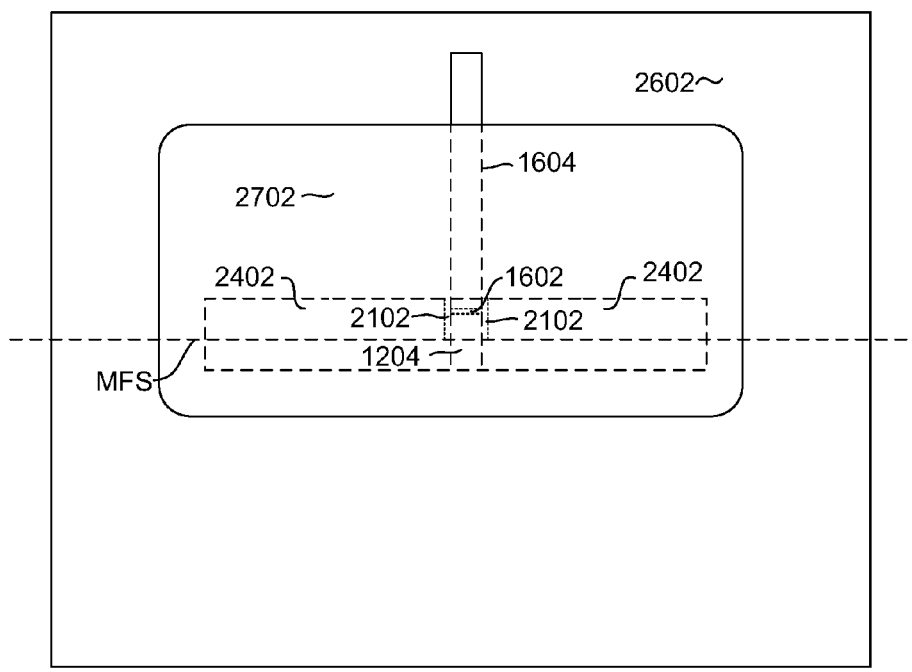
Figure 28:
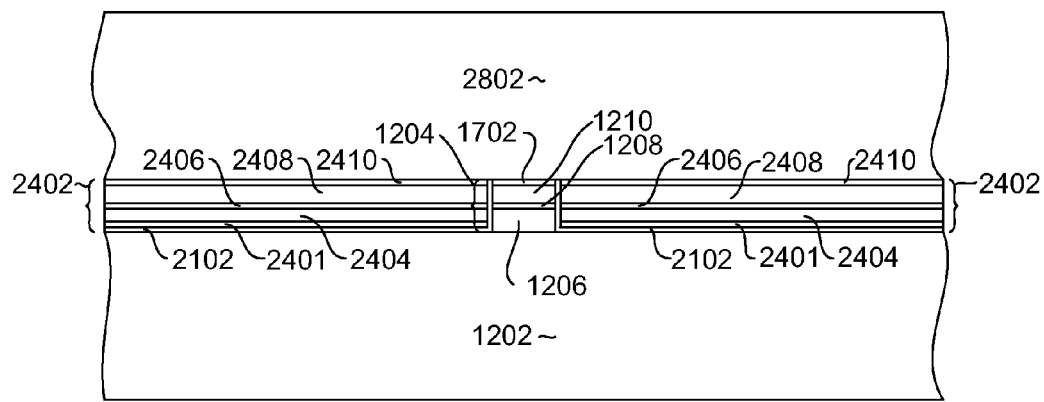
Figure 29:
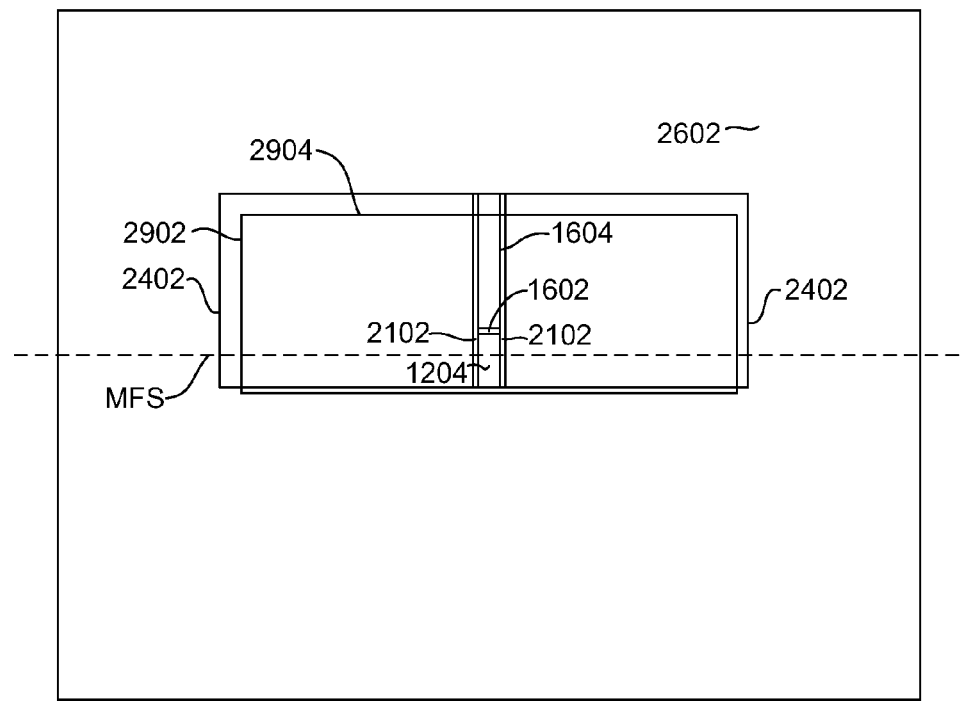

With reference to FIG. 27, a third mask 2702 is formed, having a back edge that defines a back edge of the soft bias structure 1604. Although not shown, a third mask 2702 can also define the side edge of the side shield soft bias structure 2402. An ion milling is performed to remove material that is not protected by the mask 2702. This is followed by the deposition of another fill layer 2702 and another liftoff and optional planarization process. Then, with reference to FIG. 28 an upper shield 2802 can be formed such as by electroplating. In another embodiment (as described above with reference to FIG. 4a, an AFM layer 402 can be deposited prior to depositing the upper shield 2802 formed. The AFM seed can be used to magnetically stabilize the side shield 2402.

The above describes a process for forming a sensor wherein the soft magnetic side shields are aligned with the stripe height of the sensor 1204 as seen in FIG. 27. These side shields 2402 could also extend beyond the back edge of the sensor 1204 so that they have a back edge that is somewhere between the back edge of the sensor and the back edge of the bias structure 1604. In another embodiment, the soft magnetic side shields 2402 can have a back edge that is aligned with the back edge of the bias structure 1604. In this embodiment the side shields 2402 can be deposited after the sensor width has been defined and can be formed to extend beyond the back edge of the previously formed hard bias structure 1604. The side shield can be constructed as shown in FIG. 3*a* or FIG. 3*b*. Then, with reference to FIG. 29, a mask 2902 can be formed that having a back edge 2904 that defines the back edge of both the bias structure 1604 and the back edge of the side shields 2402. Another ion milling can then be performed to remove material not protected by the mask 2902 thereby defining both the back edge of the bias structure, and the back edge of the side shields 2402 as well as the outer sides of the side shield 2402. The above described process defines the sensor stripe height first and then the track width. However, the process could also be performed so as to define the track width first and then the stripe height.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic sensor, comprising:
   a sensor stack including first and second free magnetic layers and a non-magnetic layer sandwiched between the first and second free magnetic layers and having a front edge facing a media facing surface, a back edge opposite the front edge and first and second laterally opposed sides;
   a magnetic bias structure located adjacent to the back edge of the sensor stack; and
   a soft magnetic side shield structure extending from each side of the sensor stack, and including first and second soft magnetic layers and an anti-parallel coupling layer sandwiched between the first and second soft magnetic layers, each of the soft magnetic layers having a shape that results in the magnetic layer having a magnetization that remains oriented in a direction parallel with the media facing surface;
   wherein the magnetic bias structure includes a soft magnetic layer that has a length measured perpendicular to the media facing surface and a width measured parallel with the media facing surface and wherein the length is greater than the width.

2. The magnetic sensor as in claim 1 wherein the magnetic bias structure has a shape that causes the magnetic bias structure to have a magnetization that remains oriented in a direction perpendicular to the media facing surface.

3. The magnetic sensor as in claim 1 wherein soft magnetic side shield structures are separated from the sensor stack by a non-magnetic, electrically insulating layer.

4. The magnetic sensor as in claim 1 wherein each of the soft magnetic layers of the magnetic side shield structure has a length measured parallel with the media facing surface and a width measured perpendicular to the media facing surface and wherein the length is greater than the width.

5. The magnetic read sensor as in claim 1, wherein:
   the magnetic bias structure comprises a material having an intrinsic exchange length;
   the magnetic bias structure has a length measured perpendicular to the media facing surface, a width measured parallel with the media facing surface, and a thickness measured parallel with the media facing surface and perpendicular to the width and length; and
   the width is less than 10 times the intrinsic exchange length.

6. The magnetic read sensor as in claim 1, wherein:
   each of the soft magnetic layers of the soft magnetic side shield structure comprises a material having an intrinsic exchange length;
   each of the soft magnetic layers of the soft magnetic side shield has a length measured parallel with the media facing surface, a width measured perpendicular to the media facing surface, and a thickness measured parallel with the media facing surface and perpendicular to the width and length; and
   the width and thickness are less than 10 times the intrinsic exchange length.

7. The magnetic sensor as in claim 1, wherein:
   the magnetic bias structure comprises a magnetic material having an intrinsic exchange length and which has a bias structure length measured perpendicular to the media facing surface a bias structure width measured parallel with the media facing surface and a bias structure thickness measured parallel with the media facing surface and perpendicular to the bias structure length and bias structure width, the bias structure width and bias structure thickness are each less than 10 times the intrinsic exchange length; and
   each of the soft magnetic layers of the soft magnetic side shield comprises a material having an intrinsic exchange length and has a shield length measured parallel with the media facing surface a shield width measured perpendicular to the media facing surface and a shield thickness measured parallel with the media facing surface and perpendicular to the shield length and shield width, the shield width and shield thickness being less than 10 times the intrinsic exchange length.

8. The magnetic sensor as in claim 1, wherein the magnetic bias structure and the soft magnetic layers of the magnetic side shield structure each comprise NiFe, NiFeMo, CoFe, CoNiFe or alloys thereof.

9. The magnetic sensor as in claim 1, wherein the magnetic bias structure and the soft magnetic layers of the magnetic side shield structure each comprise NiFe having 50-60 atomic percent Fe or CoFe.

10. The magnetic sensor as in claim 7, wherein the bias structure width and shield width are less than 40 nm and the bias structure thickness and shield thickness are less than 20 nm.

11. The magnetic sensor as in claim 1, wherein the magnetic bias structure comprises a layer of soft magnetic material and a layer of antiferromagnetic material exchange coupled with the layer of soft magnetic material.

12. The magnetic sensor as in claim 1, wherein the soft magnetic side shield structure further comprises a layer of antiferromagnetic material exchange coupled with one of the first and second soft magnetic layers.

13. A magnetic data recording system, comprising:
   a housing;
   a magnetic media mounted within the housing;
   a slider mounted within the housing for movement adjacent to a surface of the magnetic media;
   a magnetic sensor formed on the slider, the magnetic sensor further comprising:
   a sensor stack including first and second free magnetic layers and a non-magnetic layer sandwiched between the first and second free magnetic layers and having a front edge facing a media facing surface, a back edge opposite the front edge and first and second laterally opposed sides;

a soft magnetic bias structure located adjacent back edge of the sensor stack; and a soft magnetic side shield structure located adjacent to each side of the sensor stack, the soft magnetic side shield structure including first and second soft magnetic layers and an anti-parallel coupling layer sandwiched between the first and second soft magnetic layers, wherein each of the soft magnetic layers has a shape that causes the magnetic layer to have a magnetization oriented parallel with the media facing surface;

wherein the bias structure width and shield width are less than 40 nm and the bias structure thickness and shield thickness are less than 20 nm.

14. The magnetic data recording system as in claim 13, wherein the soft magnetic bias structure has a shape that results in the soft magnetic bias structure having a magnetization that is oriented parallel with the media facing surface.

15. The magnetic data recording system as in claim 13, wherein the soft magnetic side shield structure is separated from the sensor stack by a non-magnetic, electrically insulating layer.

16. The magnetic data recording system as in claim 13, wherein the soft magnetic bias structure has a length measured perpendicular to the media facing surface and a width measured parallel with the media facing surface and wherein the length is greater than the width.

17. The magnetic data recording system as in claim 13, wherein each of the soft magnetic layers of the soft magnetic side shield structure has a length measured parallel with the media facing surface and a width measured perpendicular to the media facing surface and wherein the length is greater than the width.

18. The magnetic data recording system as in claim 13, wherein:

the soft magnetic bias structure comprises a material having an intrinsic exchange length;

the soft magnetic bias structure has a length measured perpendicular to the media facing surface, a width measured parallel with the media facing surface, and a thickness measured parallel with the media facing surface and perpendicular to the width and length; and the width and thickness are each less than 10 times the intrinsic exchange length.

19. The magnetic data recording system as in claim 13, wherein:

each of the soft magnetic layers of the soft magnetic side shield comprises a material having an intrinsic exchange length;

each of the soft magnetic layers of the soft magnetic side shield has a length measured parallel with the media facing surface, a width measured perpendicular to the media facing surface, and a thickness measured parallel with the media facing surface and perpendicular to the width and length; and the width and thickness are less than 10 times the intrinsic exchange length.

20. The magnetic data recording system as in claim 13, wherein:

the soft magnetic bias structure comprises a material having an intrinsic exchange length and has a bias structure length measured perpendicular to the media facing surface a bias structure width measured parallel with the media facing surface and a bias structure thickness measured parallel with the media facing surface and perpendicular to the bias structure length and bias structure width, the bias structure width and bias structure thickness being less than 10 times the intrinsic exchange length; and each of the soft magnetic layers of the soft magnetic side shield structure comprises a material having an intrinsic exchange length and has a shield length measured parallel with the media facing surface a shield width measured perpendicular to the media facing surface and a shield thickness measured parallel with the media facing surface and perpendicular to the shield length and shield width, the shield width and shield thickness being less than 10 times the intrinsic exchange length.

21. The magnetic data recording system as in claim 13, wherein the soft magnetic bias structure and the soft magnetic layers of the magnetic side shield structure each comprise NiFe, NiFeMo, CoFe, CoNiFe or alloys thereof.

22. The magnetic data recording system as in claim 13, wherein the soft magnetic bias structure and the soft magnetic layers of the magnetic side shield structure each comprise NiFe having 50-60 atomic percent Fe or CoFe.

* * * * *